United States Patent
Zeng et al.

(10) Patent No.: US 11,093,092 B2
(45) Date of Patent: Aug. 17, 2021

(54) DISPLAY PANEL AND DISPLAY DEVICE

(71) Applicant: Shanghai Tianma Micro-Electronics Co., Ltd., Shanghai (CN)

(72) Inventors: Yang Zeng, Shanghai (CN); Feng Lu, Shanghai (CN); Haochi Yu, Shanghai (CN); Qing Zhang, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 16/600,748

(22) Filed: Oct. 14, 2019

(65) Prior Publication Data
US 2020/0379602 A1 Dec. 3, 2020

(30) Foreign Application Priority Data
May 31, 2019 (CN) .......................... 201910472148.8

(51) Int. Cl.
*G06F 3/044* (2006.01)
*G06F 3/041* (2006.01)
*G06K 9/00* (2006.01)

(52) U.S. Cl.
CPC .......... *G06F 3/0443* (2019.05); *G06F 3/0412* (2013.01); *G06K 9/00013* (2013.01)

(58) Field of Classification Search
None
See application file for complete search history.

(56) References Cited

U.S. PATENT DOCUMENTS

| 2014/0210784 | A1* | 7/2014 | Gourevitch | G06F 3/0443 345/174 |
|---|---|---|---|---|
| 2016/0370920 | A1* | 12/2016 | Fan | G06F 3/0412 |
| 2017/0091508 | A1* | 3/2017 | Han | G06F 3/041 |
| 2017/0293378 | A1* | 10/2017 | Ahn | G06K 9/0002 |
| 2018/0046281 | A1* | 2/2018 | Pi | G06K 9/00114 |

(Continued)

FOREIGN PATENT DOCUMENTS

| CN | 108242453 A | 7/2018 |
|---|---|---|
| CN | 108461533 A | 8/2018 |
| CN | 108922905 A | 11/2018 |

OTHER PUBLICATIONS

Chinese Office Action for related Chinese Application No. 201910472148.8; dated Oct. 29, 2020.

*Primary Examiner* — Dorothy Harris
(74) *Attorney, Agent, or Firm* — von Briesen & Roper, s.c.

(57) ABSTRACT

Provided are a display panel and a display device. The display panel includes a fingerprint identification module, a light-blocking layer, a light-emitting device layer and a touch function layer which are sequentially stacked, where the light-blocking layer includes a plurality of imaging apertures; and the touch function layer includes a plurality of first touch areas and a plurality of second touch areas. The plurality of first touch areas do not overlap with imaging aperture identification areas, and the plurality of second touch areas overlap with at least one of the imaging aperture identification areas. Reflectivity of the second touch area is smaller than reflectivity of the first touch area; or transmittance of the second touch area is greater than transmittance of the first touch area; or light transmission uniformity of the second touch area is greater than light transmission uniformity of the first touch area.

15 Claims, 16 Drawing Sheets

(56) References Cited

U.S. PATENT DOCUMENTS

| | | | | |
|---|---|---|---|---|
| 2018/0366593 A1* | 12/2018 | Huang | .............. | H01L 27/14643 |
| 2019/0220113 A1* | 7/2019 | Zheng | .................. | G06F 3/0443 |
| 2020/0004381 A1* | 1/2020 | Han | ...................... | H01L 27/323 |
| 2020/0133414 A1* | 4/2020 | Lee | ........................ | G06F 3/0443 |

* cited by examiner

--Prior Art--

DISPLAY PANEL AND DISPLAY DEVICE

CROSS-REFERENCE TO RELATED APPLICATIONS

This application claims priority to Chinese patent application No. 201910472148.8 filed on May 31, 2019, the disclosure of which is incorporated herein by reference in its entirety.

TECHNICAL FIELD

Embodiments of the present disclosure relate to the technical field of fingerprint identification, and in particular, to a display panel and a display device.

BACKGROUND

Fingerprints are inherent and unique to every person. With the development of science and technology, various display devices with a fingerprint identification function, such as mobile phones, tablet computers, and smart wearable equipment, appear on the market. In this way, before operating a display device with the fingerprint identification function, a user just needs to touch a fingerprint identification module of the display device by using a finger for performing the authority verification, thereby simplifying the authority verification process.

The existing display device with the fingerprint identification function may be provided with a plurality of apertures for imaging. The light emitted by a light-emitting layer is reflected by the finger and imaged after passing through the apertures, to achieve the purpose of fingerprint identification. Due to the small opening area of the imaging aperture and the blocking of other film layers, less light is transmitted through the aperture to a fingerprint identification unit, resulting in a low sensitivity of the fingerprint identification.

SUMMARY

In view of this, embodiments of the present disclosure provide a display panel and a display device, to solve the technical problem in the related art of a low fingerprint identification sensitivity because less light is transmitted through imaging apertures to a fingerprint identification unit.

In a first aspect, an embodiment of the present disclosure provides a display panel. The display panel includes a light-blocking layer, a light-emitting device layer, a touch function layer and a fingerprint identification module. The light-emitting device layer is disposed on the light-blocking layer. The light-blocking layer includes a plurality of imaging apertures.

The touch function layer is disposed on one side of the light-emitting device layer facing away from the light-blocking layer. The touch function layer includes a first touch area and a second touch area. The first touch area does not overlap with imaging aperture identification areas, and the second touch area overlaps with at least one of the imaging aperture identification areas. A reflectivity of the second touch area is smaller than a reflectivity of the first touch area; or a transmittance of the second touch area is greater than a transmittance of the first touch area; or light transmission uniformity of the second touch area is greater than light transmission uniformity of the first touch area; or the second touch area includes a hollowed-out area. Each of the imaging aperture identification areas is an identifiable area of each of the plurality imaging apertures on a plane where the touch function layer is located.

The fingerprint identification module is disposed on one side of the light-blocking layer facing away from the light-emitting device layer. The fingerprint identification module is configured to receive first reflected light reflected through the light-blocking layer by a touch body and perform fingerprint identification according to the first reflected light.

In a second aspect, an embodiment of the present disclosure further provides a display device including the display panel described in the first aspect.

In the display panel and the display device provided by the embodiments of the present disclosure, the light-blocking layer includes the plurality of imaging apertures, the touch function layer includes the first touch area and the second touch area, where the first touch area does not overlap with the plurality of imaging apertures, and the second touch area overlaps with at least one of the imaging aperture identification areas; the reflectivity of the second touch area is smaller than the reflectivity of the first touch area, or the light transmittance of the second touch area is greater than the light transmittance of the first touch area, or the light transmission uniformity of the second touch area is greater than the light transmission uniformity of the first touch area, or the second touch area includes the hollowed-out area. In this way, a light flux and uniformity of light transmitted through the second touch area into the imaging apertures and the fingerprint identification module may be increased, light within the imaging aperture identification areas may be more easily incident through the imaging apertures into the fingerprint identification module to increase optical signals received by a fingerprint identification unit and improve a sensitivity of the fingerprint identification unit. Meanwhile, the second touch area of the touch function layer may be prevented from directly reflecting light emitted from a light source of the fingerprint identification module to reduce interference light into the imaging apertures and the fingerprint identification module, thereby improving a fingerprint identification sensitivity.

BRIEF DESCRIPTION OF DRAWINGS

Other features, objects and advantages of the present disclosure will become more apparent from a detailed description of non-restrictive embodiments with reference to the drawings.

DETAILED DESCRIPTION

In order to make the objects, technical solutions and advantages of the present disclosure clearer, the technical solutions of the present disclosure will be described below in detail in conjunction with the drawings in the embodiments of the present disclosure and the specific embodiments. Apparently, the described embodiments are part, not all, of the embodiments of the present disclosure, and based on the embodiments of the present disclosure, other embodiments obtained by those skilled in the art on the premise that no creative work is done are within the scope of the present disclosure.

Figure 1:
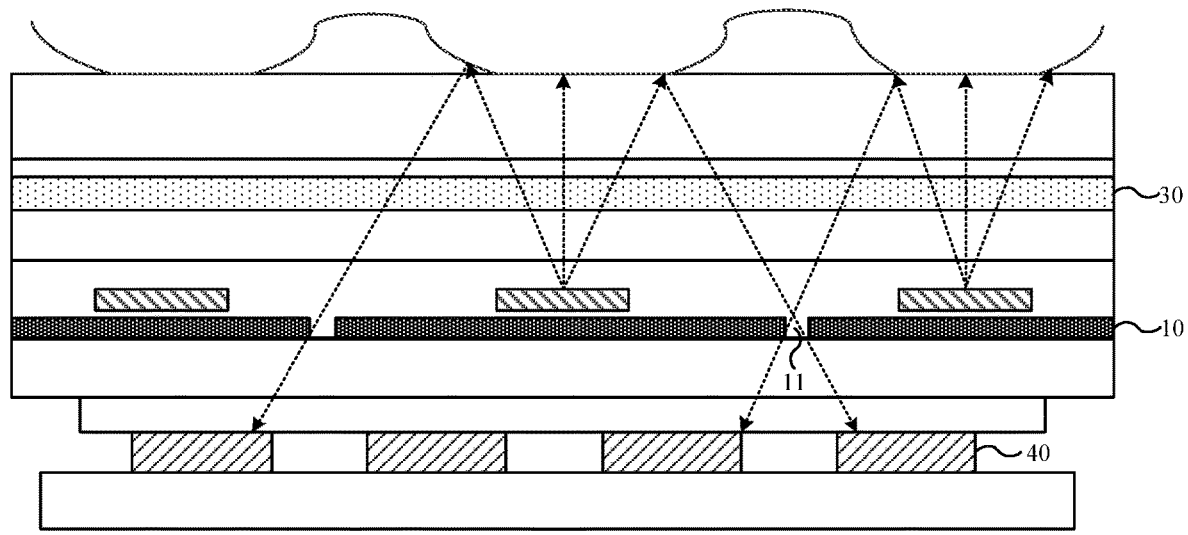
FIG. 1 is a structural diagram of a display panel including a touch function layer in a related art.

FIG. 1 is a structural diagram of a display panel including a touch function layer in the related art. As shown in FIG. 1, a light-blocking layer 10 is provided with a plurality of imaging apertures 11. A touch function layer 30 is disposed on one side of the light-blocking layer 10 facing away from a fingerprint identification module 40. Through research, inventors have discovered that because the touch function layer 30 has an opaque touch metal electrode or a light-transmissive touch electrode including a pattern with visible borders or a touch electrode with a greater reflectivity, the touch function layer 30 disposed on one side of the light-blocking layer 10 facing away from the fingerprint identification module 40 affects light entering the imaging apertures 11, thereby affecting light received by the fingerprint identification module 40 and a fingerprint identification sensitivity.

Based on the above technical problem, the inventors have further developed a display panel according to an embodiment of the present disclosure. The display panel includes a light-blocking layer, a light-emitting device layer, a touch function layer and a fingerprint identification module. The light-emitting device layer is disposed on the light-blocking layer. The light-blocking layer includes a plurality of imaging apertures. The touch function layer is located on one side of the light-emitting device layer facing away from the light-blocking layer. The touch function layer includes a first touch area and a second touch area. The first touch area does not overlap with imaging aperture identification areas, and the second touch area overlaps with at least one of the imaging aperture identification areas. A reflectivity of the second touch area is smaller than a reflectivity of the first touch area. Each of the imaging aperture identification areas is an identifiable area on a plane where the touch function layer is located corresponding to each of the plurality imaging apertures. The fingerprint identification module is located on one side of the light-blocking layer facing away from the light-emitting device layer. The fingerprint identification module is configured to receive first reflected light reflected through the light-blocking layer by a touch body, and perform fingerprint identification according to the first reflected light. In the above technical solution, the plurality of imaging apertures are disposed in the light-blocking layer, the touch function layer includes the first touch area and the second touch area, the first touch area does not overlap with the imaging aperture identification areas, the second touch area overlaps with the at least one of the imaging aperture identification areas, and the reflectivity of the second touch area is smaller than the reflectivity of the first touch area. In this way, light reflected by the second tough area may be reduced and more light within the imaging aperture identification areas may be guaranteed to pass through the imaging aperture and be incident into the fingerprint identification module, and a light flux received by the fingerprint identification unit is increased, thereby improving a fingerprint identification sensitivity of the fingerprint identification module.

The above is a core idea of the present disclosure. The technical solutions in the embodiments of the present disclosure will be described clearly and completely in conjunction with the drawings in the embodiments of the present disclosure. Based on the embodiments of the present disclosure, other embodiments obtained by those skilled in the art on the premise that no creative work is done are within the scope of the embodiments of the present disclosure.

Figure 2:
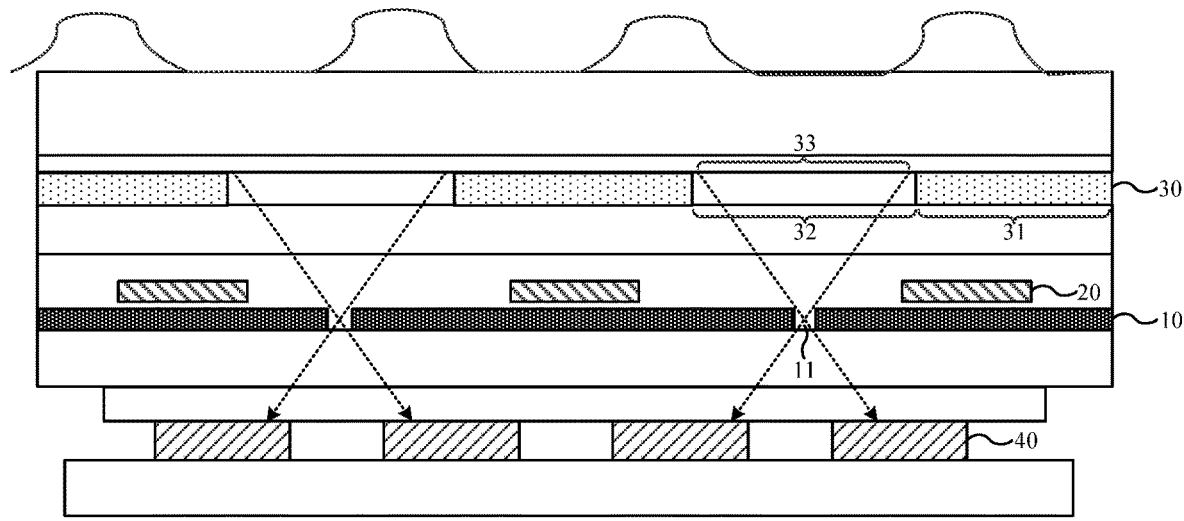
FIG. 2 is a structural diagram of a display panel according to an embodiment of the present disclosure.

FIG. 2 is a structural diagram of a display panel according to an embodiment of the present disclosure. As shown in FIG. 2, the display panel provided by the embodiment of the present disclosure includes a light-blocking layer 10, a light-emitting device layer 20, a touch function layer 30 and a fingerprint identification module 40. The light-emitting device layer 20 is disposed on the light-blocking layer 10. The light-blocking layer 10 includes a plurality of imaging apertures 11. The touch function layer 30 is located on one side of the light-emitting device layer 20 facing away from the light-blocking layer 10. The touch function layer 30 includes a first touch area 31 and a second touch area 32. The first touch area 31 does not overlap with imaging aperture identification areas 33, and the second touch area 32 overlaps with at least one of the imaging aperture identification areas 33. The reflectivity of the second touch area 32 is smaller than the reflectivity of the first touch area 31; or the transmittance of the second touch area 32 is greater than the transmittance of the first touch area 31; or the light transmission uniformity of the second touch area 32 is greater than the light transmission uniformity of the first touch area 31; or the second touch area 32 includes a hollowed-out area. Each of the imaging aperture identification areas 33 is an identifiable area on a plane where the touch function layer 30 is located corresponding to each of the plurality imaging apertures 11. The fingerprint identification module 40 is located on one side of the light-blocking layer 10 facing away from the light-emitting device layer 20. The fingerprint identification module 40 is configured to receive first reflected light reflected through the light-blocking layer 10 by using a touch body, and perform fingerprint identification according to the first reflected light.

Exemplarily, the light-blocking layer 10 is provided with the plurality of imaging apertures 11. Light emitted from a fingerprint identification light source is reflected by the touch body (such as a finger) and incident into the fingerprint identification module 40 through the imaging apertures 11, and the fingerprint identification module 40 is configured to perform the fingerprint identification according to the received light. Since the display panel provided by the embodiment of the present disclosure further includes the touch function layer 30 located on the side of the light-emitting device layer 20 facing away from the light-blocking layer 10, to ensure a greater light flux incident into the fingerprint identification module 40 through the imaging aperture 11 and the fingerprint identification sensitivity, it should be ensured that light within an effective field of view of each imaging aperture 11 is not blocked by the touch function layer 30 or slightly blocked by the touch function layer 30. Based on the above inventive concept, in the embodiment of the present disclosure, the touch function layer 30 includes the first touch area 31 and the second touch area 32. The first touch area 31 does not overlap with the imaging aperture identification areas 33, the second touch area 32 overlaps with at least one of the imaging aperture identification areas 33. Each of the imaging aperture identification areas 33 may be understood as an identifiable area on the plane where the touch function layer 30 is located corresponding to each imaging aperture 11, or a projection area of the effective field of view of each imaging aperture 11 on the plane where the touch functional layer 30 is located. Since the first touch area 31 does not overlap with the imaging aperture identification areas 33, and the second touch area 32 overlaps with at least one of the imaging aperture identification areas 33, in order to ensure that the second touch area 32 does not block the light incident into the fingerprint identification module 40 through each imaging aperture 11, the reflectivity of a surface of the second touch area 32 facing away from the light-emitting device layer 20 is configured to be smaller than reflectivity of a surface of the first touch area 31 facing away from the light-emitting device layer 20, or the transmittance of the second touch area 32 is configured to be greater than the transmittance of the first touch area 31, or the second touch area 32 includes the hollowed-out area, so that the light reflected by the second touch area 32 is reduced, light transmitted through the second touch area 32 is increased, and the fingerprint identification sensitivity is improved. Furthermore, the reflectivity of a surface of the second touch area 32 facing to the light-emitting device layer 20 is configured to be smaller than reflectivity of a surface of the first touch area facing to the light-emitting device layer 20, so that a case where the light emitted from the fingerprint identification light source (for example, the light-emitting device layer) is reflected by the surface of the second touch area facing to the light-emitting device layer 20 and directly incident into the fingerprint identification module 40 through the imaging apertures 11 may be reduced, and all the light received by the fingerprint identification module 40 is ensured to be light reflected to the imaging apertures 11 and the fingerprint identification module 40 by the touch body. Therefore, the accuracy and sensitivity of the fingerprint identification is further improved. Furthermore, the light transmission uniformity of the second touch area 32 is configured to be greater than light transmission uniformity of the first touch area 31, so that the light reflected by the touch body may be ensured to be uniformly transmitted through the second touch area, thereby ensuring the accuracy and sensitivity of the fingerprint identification. Furthermore, since the first touch area 31 does not overlap with the imaging aperture identification areas 33, the first touch area 31 does not affect the light incident through the imaging apertures 11 anyway, and thus the embodiment of the present disclosure imposes no limitations on how to configure the first touch area 31.

It should be noted that the reflectivity of the second touch area 32 is smaller than the reflectivity of the first touch area 31, which includes that the reflectivity of the surface of the second touch area 32 facing away from the light-emitting device layer 20 is smaller than the reflectivity of the surface of the first touch area 31 facing away from the light-emitting device layer 20 and that the reflectivity of the surface of the second touch area 32 facing to the light-emitting device layer 20 is smaller than the reflectivity of the surface of the first touch area 31 facing to the light-emitting device layer 20. When the reflectivity of the surface of the second touch area 32 facing away from the light-emitting device layer 20 is smaller than the reflectivity of the surface of the first touch area 31 facing away from the light-emitting device layer 20, the light reflected by the touch body may be reflected by the second touch area 32 to a smaller degree, the light reflected by the touch body may be transmitted through the imaging aperture 11 into the fingerprint identification module 40 to a larger degree, and the light flux received by the fingerprint identification module 40 may be increased, thereby improving the fingerprint identification sensitivity. When the reflectivity of the surface of the second touch area 32 facing to the light-emitting device layer 20 is smaller than the reflectivity of the surface of the first touch area facing to the light-emitting device layer 20, the case where the light emitted from the fingerprint identification light source (for example, the light-emitting device layer) is reflected by the surface of the second touch area facing to the light-emitting device layer 20 and directly incident into the fingerprint identification module 40 through the imaging apertures 11 may be reduced, and all the light received by the fingerprint identification module 40 is ensured to be the light reflected into the imaging apertures 11 and the fingerprint identification module 40 by the touch body, thereby further improving the accuracy and sensitivity of the fingerprint identification.

It should be noted that the reflectivity of the second touch area 32 is configured to be smaller than the reflectivity of the first touch area 31, and the transmittance of the second touch area 32 is configured to be greater than the transmittance of the first touch area 31 in the following manners: the second touch area 32 may be provided with a hollowed-out area to reduce the reflectivity of the second touch area 32 and increase the transmittance of the second touch area 32; the second touch area 32 may also be attached with an antireflection film to increase the transmittance of the second touch area 32 and reduce the reflectivity of the second touch area 32, thereby ensuring that the second touch area 32 has a good light transmission effect. Thus, more light is ensured to be received by the fingerprint identification module 40 through the imaging apertures 11, and the fingerprint identification sensitivity is ensured. The embodiments of the present disclosure do not limit how to make the reflectivity of the second touch area 32 smaller than the reflectivity of the first touch area 31 and how to make the transmittance of the second touch area 32 greater than the transmittance of the first touch area 31. Other technical solutions capable of making the reflectivity of the second touch area 32 smaller than the reflectivity of the first touch area 31 and making the transmittance of the second touch area 32 greater than the transmittance of the first touch area 31 are also within the scope of the embodiments of the present disclosure. Similarly, the embodiments of the present disclosure do not limit how to make the light transmission uniformity of the second touch area 32 greater than the light transmission uniformity of the first touch area 31.

Of course, in other alternative embodiments of the present application, the first touch area and the second touch area belong to a film layer where a touch electrode layer is located.

Optionally, the display panel according to the embodiment of the present disclosure may further include a substrate and an array layer on the substrate. The array layer includes a drive circuit including a thin film transistor (not shown in the figure).

Exemplarily, the substrate may be a rigid substrate or a flexible substrate, which is not limited in the embodiments of the present disclosure. The thin film transistor in the drive circuit may include an active layer, a gate insulation layer, a gate layer, an interlayer insulation layer, and a source/drain electrode layer sequentially disposed on one side of the substrate. A gate, a scan line and a first plate of a storage capacitor in the drive circuit may be formed in the gate layer 23. A source, a drain, a data line and a power source signal line in the drive circuit may be formed in the source/drain electrode layer. The gate insulation layer and the interlayer insulation layer may be made of materials including an oxide of silicon or a nitride of silicon, which is not limited in the embodiments of the present disclosure. The drive circuit may further include an intermediate insulation layer and an intermediate metal layer that are disposed between the gate layer and the interlayer insulation layer and stacked in a direction facing away from the substrate. A second plate of the storage capacitor and a reference voltage line may generally be formed in the intermediate metal layer.

Optionally, the display panel according to the embodiment of the present disclosure may further include the light-emitting device layer 20. The light-emitting device layer 20 includes a plurality of light-emitting units. The light-emitting units in the embodiment of the present disclosure may be organic light-emitting units, each of the organic light-emitting units may include anodes, a pixel definition layer, an organic light-emitting layer and a cathode layer (not shown in the figure). The pixel definition layer includes openings which have a one-to-one correspondence with the anodes and through which the anodes are exposed. The light-emitting units may be light sources of the fingerprint identification module 40, so that a light source does not need to be individually disposed for the fingerprint identification module 40 of the display panel, the display panel has a simple structure and a simple relationship between film layers, and it is easy to achieve the lightening and thinning of the display panel. Alternatively, the display panel according to the embodiment of the present disclosure may further include the fingerprint identification light source (not shown in the figure). The fingerprint identification light source alone provides a light source for the fingerprint identification module 40 to ensure that the fingerprint identification module 40 may have a plurality of functions. For example, the fingerprint identification light source may be an infrared light source, so as to ensure that the fingerprint identification module 40 may identify a blood flow condition of a human body and monitor health of the human body in addition to the fingerprint identification.

Optionally, the display panel according to the embodiment of the present invention may further include an encapsulation layer (not shown in the figure) which is located on one side of the light-emitting device layer 20 facing away from the light-blocking layer 10 and configured to provide water and oxygen protection for the organic light-emitting units. Optionally, the encapsulation layer may be a glass encapsulation layer or a thin film encapsulation layer, which is not limited in the embodiments of the present disclosure.

Optionally, the touch function layer 30 in the embodiments of the present disclosure may be a self-capacitive touch function layer or a mutual-capacitive touch function layer. The mutual-capacitive touch function layer may include a touch drive electrode and a touch sensing electrode located in the same layer, or may include the touch drive electrode and the touch sensing electrode located in different layers, which is not limited in the embodiments of the present disclosure.

Optionally, the fingerprint identification module 40 may optionally be an external fingerprint identification module, that is, the fingerprint identification module 40 is located on one side of the light-blocking layer 10 facing away from the light-emitting device layer 20 and configured to receive the first reflected light reflected through the light shielding layer 10 by the touch body and perform the fingerprint identification according to the first reflected light. Of course, in other alternative embodiments of the present disclosure, a fingerprint identification sensor may also be an internal fingerprint identification sensor, which is not limited in the embodiments of the present disclosure.

Optionally, still referring to FIG. 2, the touch function layer 30 according to the embodiment of the present disclosure includes a plurality of second touch areas 32, and merely two second touch areas 32 are exemplarily shown in FIG. 2. One second touch area 32 overlaps with one of the imaging aperture identification areas 33, or one of the imaging aperture identification areas 33 is covered by one second touch area 32.

Exemplarily, the touch function layer 30 according to the embodiment of the present disclosure includes the plurality of second touch areas 32. One second touch area 32 corresponds to one imaging aperture identification area 33. Specifically, one second touch area 32 may overlap with one imaging aperture identification area 33, or one second touch area 32 may cover one imaging aperture identification area 33. The first touch area 31 is disposed between two adjacent second touch areas 32. An area of the second touch area 32 is guaranteed to be small, so that the second touch area 32 may be prevented from overlapping with several imaging aperture identification areas 33 because a large second touch area 32 affects a normal touch function of the second touch area 32, and the display panel may have both a good fingerprint identification sensitivity and a good touch sensitivity.

Figure 3:
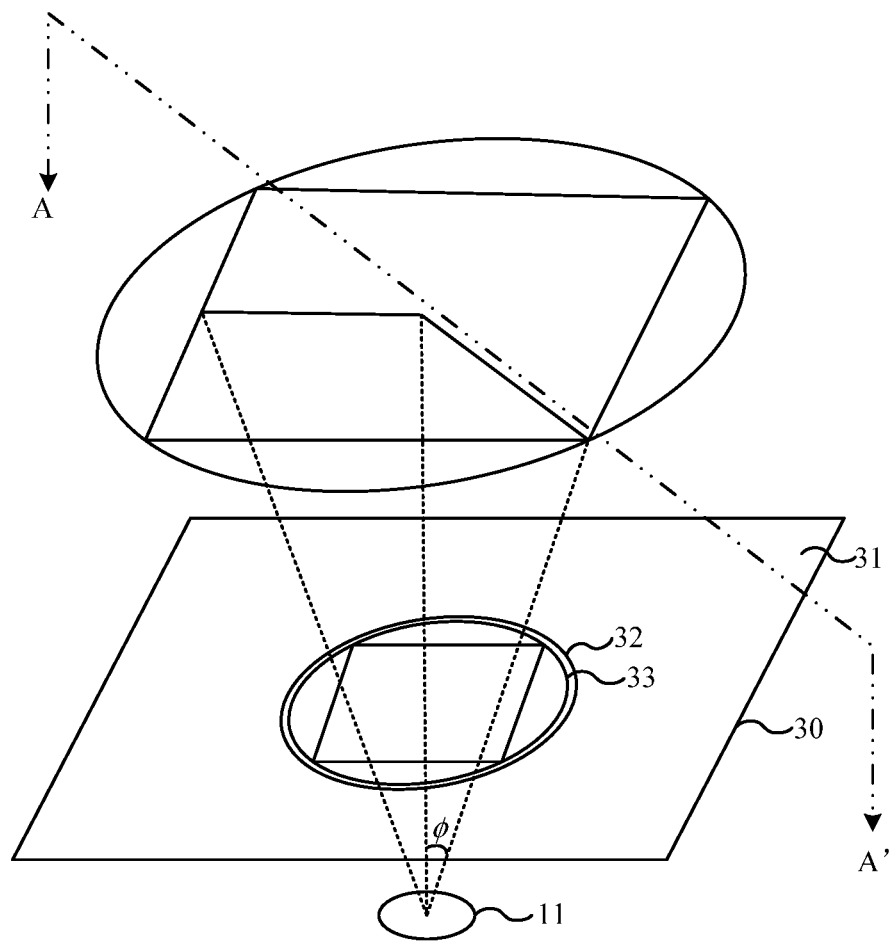
FIG. 3 is a schematic diagram showing an imaging aperture identification area corresponding to a single imaging aperture according to an embodiment of the present disclosure.
Figure 4:
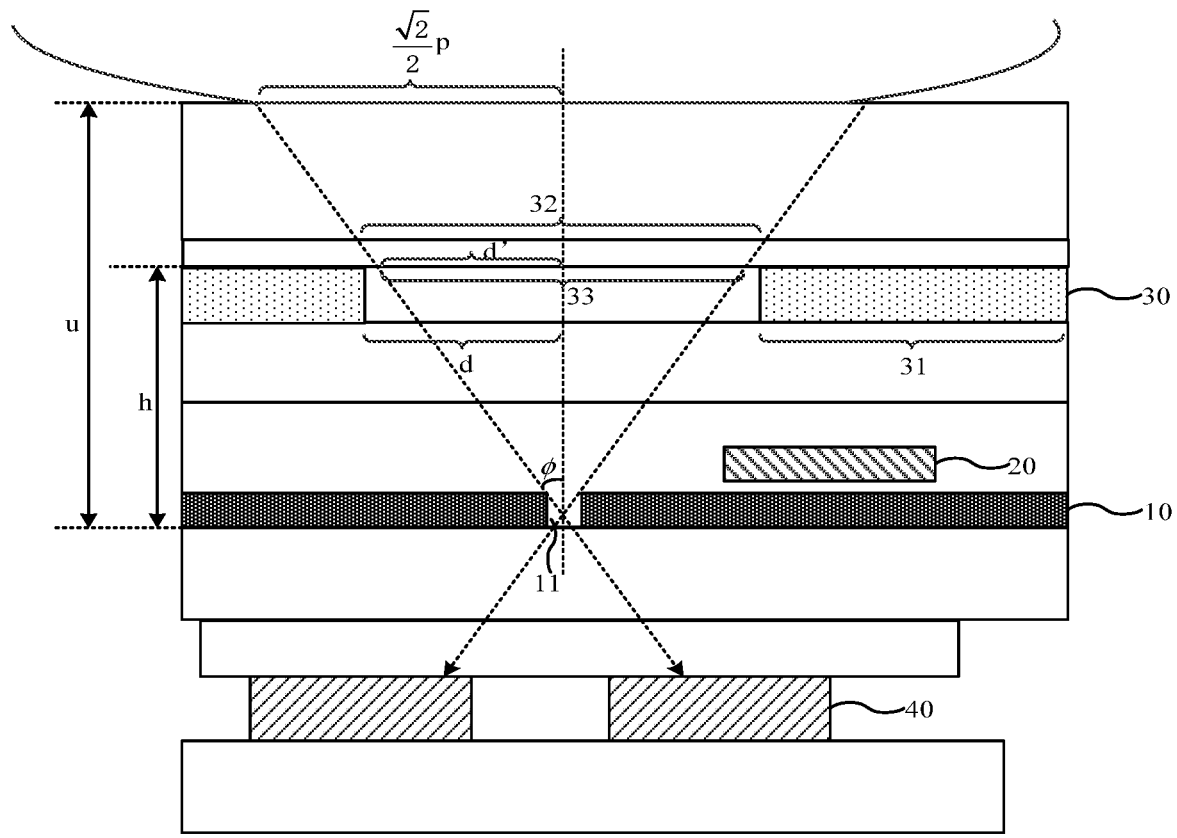
FIG. 4 is a cross sectional view of the imaging aperture identification area shown in FIG. 3 by taking along a line A-A'.
Figure 5:
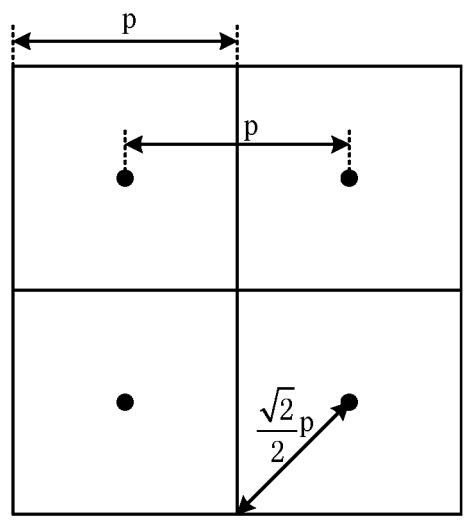
FIG. 5 is a schematic diagram illustrating identification areas of a plurality of imaging apertures on a plane where a touch body is located according to an embodiment of the present disclosure.

FIG. 3 is a schematic diagram showing an imaging aperture identification area corresponding to a single imaging aperture according to an embodiment of the present disclosure. FIG. 4 is a cross sectional view of the imaging aperture identification area shown in FIG. 3 by taking along a line A-A'. FIG. 5 is a schematic diagram illustrating identification areas of a plurality of imaging apertures on a plane where a touch body is located according to an embodiment of the present disclosure. As shown in FIG. 3, FIG. 4 and FIG. 5, when an aperture imaging principle is employed to detect a fingerprint image, to stitch identification areas of different imaging apertures 11 to obtain a complete image of the touch body, each imaging aperture 11 collects an image area that is a fixed area, such as a square area shown in FIG. 3 and FIG. 5. A side length of the square area is a distance between center points of two adjacent imaging apertures 11.

As shown in FIG. 4, $$\tan \emptyset = \frac{d'}{h} = \frac{\sqrt{2}\,p}{2u},$$

so that $$d' = \frac{\sqrt{2}\,p}{2u} \times h.$$

Where ∅ denotes an angle between a line from a center point of the imaging aperture 11 to a center point of an identification area of the imaging aperture 11 on the plane where the touch body is located and a line from the center point of the imaging aperture 11 and an edge point of the identification area of the imaging aperture 11 on the plane where the touch body is located; d' denotes a distance between an edge of an orthographic projection of the imaging aperture identification area 33 on a plane where the light-blocking layer 10 is located and the imaging aperture; P denotes a distance between center points of any two adjacent imaging apertures 11, that is, a side length of a square detection area of the imaging aperture 11 on the plane where the touch body is located; u denotes a vertical distance between a touch surface of the display panel and the light-blocking layer 10; and h denotes a vertical distance between the touch function layer 30 and the light-blocking layer 10.

Meanwhile, to avoid an effect of the touch function layer 30 on detection, an opaque structure or a border of a transparent pattern of the touch functional layer 30 needs to avoid the field of view of the imaging aperture 11 (i.e., the imaging aperture identification area 33). That is, a coverage area of the second touch area 32 needs to be greater than or equal to a coverage area of the imaging aperture identification area 33, which means that d≥d', that is, $$d' \geq \frac{\sqrt{2}\,p}{2u} \times h.$$

As shown in FIG. 3 and FIG. 4, d denotes a distance between an edge of an orthographic projection of the second touch area 32 on the plane where the light-blocking layer 10 is located and the imaging aperture 11. It should be noted that FIG. 3 and FIG. 4 only illustrate that the coverage area of the second touch area 32 is slightly greater than the coverage area of the imaging aperture identification area 33.

In one possible solution, the distance P between the center points of any two adjacent imaging apertures 11 satisfies P=700 μm, the vertical distance u between the touch surface of the display panel and the light-blocking layer 10 satisfies u=1000 μm, and the vertical distance h between the touch function layer 30 and the light-blocking layer 10 satisfies h=300 um. According to the formula $$d \geq \frac{\sqrt{2}\,P}{2u} \times h,$$

that d≥5 μm may be obtained, which means that the distance between the edge of the orthographic projection of the second touch area 32 on the plane where the light-blocking layer 10 is located and the imaging aperture 11 is greater than or equal to 5 μm. If a diameter of the imaging aperture 11 is 10 μm, a diameter of the second touch area 32 is greater than or equal to 20 μm. Therefore, in order to ensure that the touch function layer 30 blocks less light incident into the fingerprint identification film layer 40 through the imaging aperture 11 and ensure a high fingerprint identification sensitivity, the touch function layer 30 needs to be provided with the second touch area 32 with a diameter greater than or equal to 20 μm. The second touch area 32 overlaps with the imaging aperture identification area 33, and the second touch area 32 has a low reflectivity, so that more light is transmitted through the second touch area 32 and incident into the fingerprint identification module 40 through the imaging aperture 11, thereby ensuring the high fingerprint identification sensitivity of the fingerprint identification module 40.

Figure 6:
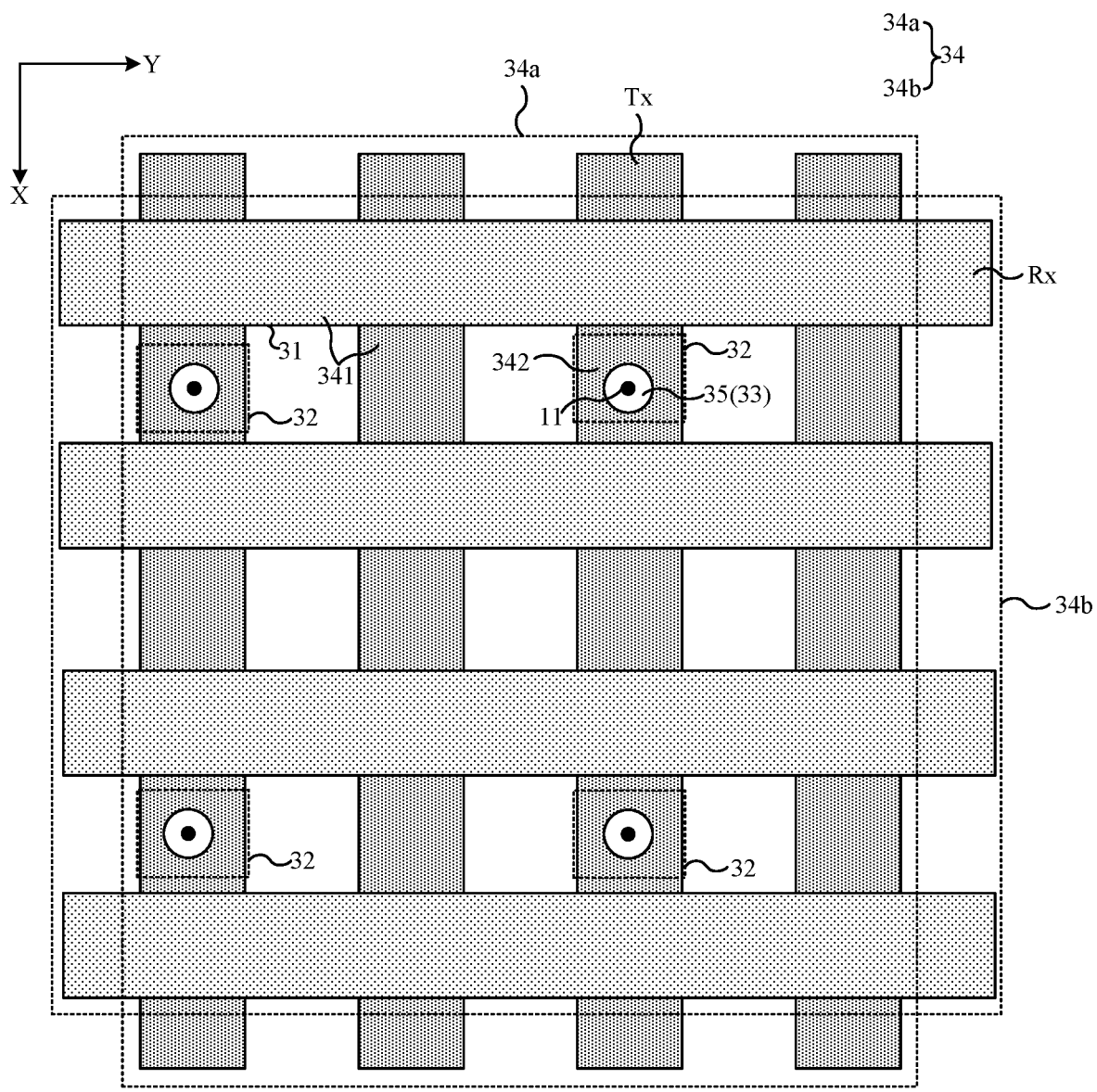
FIG. 6 is a top view of a display panel according to an embodiment of the present disclosure.

FIG. 6 is a top view of a display panel according to an embodiment of the present disclosure. As shown in FIG. 6, the touch function layer 30 of the display panel according to the embodiment of the present disclosure at least includes a touch electrode layer 34. The touch electrode layer 34 includes a first electrode pattern 341 in the first touch area 31 and a second electrode pattern 342 in the second touch area 32. The second electrode pattern 342 overlaps with the imaging aperture identification areas 33, and transmittance of the second electrode pattern 342 is greater than transmittance of the first electrode pattern 341. The first touch area 31 may be understood as all areas of the touch functional layer 30 except the second touch area 32.

Exemplarily, FIG. 6 illustrates that the touch function layer 30 is the mutual-capacitive touch function layer, and a touch drive electrode layer and a touch sensing electrode layer forming the mutual-capacitive touch function layer are located in different film layers. As shown in FIG. 6, the touch electrode layer 34 includes a touch drive electrode layer 34a and a touch sensing electrode layer 34b. Optionally, at least one transparent insulation layer (not shown in the figure) is spaced between the touch drive electrode layer 34a and the touch sensing electrode layer 34b. The touch drive electrode layer 34a includes a plurality of strip electrodes TX. The plurality of strip electrodes TX extend in a first direction (a direction X shown in the figure) and are arranged in a second direction (a direction Y shown in the figure), where the first direction intersects the second direction. The touch sensing electrode layer 34b includes a plurality of strip electrodes RX. The plurality of strip electrodes RX extend in the second direction (the direction Y shown in the figure) and are arranged in the first direction (the direction X shown in the figure). The touch drive electrode layer 34a and the touch sensing electrode layer 34b both include the first electrode pattern 341 in the first touch area 31. The touch drive electrode layer 34a and/or the touch sensing electrode layer 34b include the second electrode pattern 342 in the second touch area 32. FIG. 6 merely illustrates that the touch drive electrode layer 34a includes the second electrode pattern 342 in the second touch area 32. The second electrode pattern 342 overlaps with the imaging aperture identification area 33, and the transmittance of the second electrode pattern 342 is greater than the transmittance of the first electrode pattern 341, so that it is ensured that more light is ensured transmitted through the second electrode pattern 342 and the imaging aperture 11 into the fingerprint identification module 40, thereby ensuring the high fingerprint identification sensitivity of the fingerprint recognition module 40.

Furthermore, the transmittance of the second electrode pattern 342 is greater than the transmittance of the first electrode pattern 341 in the following manner: the second electrode pattern 342 may be provided with the hollowed-out area or be attached with the antireflection film to increase the transmittance of the second electrode pattern 342. FIG. 6 merely illustrates that the second electrode pattern 342 is provided with the hollowed-out area. As shown in FIG. 6, the second electrode pattern 342 includes a hollowed-out area 35, and the hollowed-out area 35 overlaps with at least one of the imaging aperture identification areas 33. FIG. 6 illustrates that the hollowed-out area 35 completely overlaps with the imaging aperture identification area 33. It is ensured that light through the hollowed-out area 35 is directly transmitted through the imaging aperture 11 into the fingerprint identification module 40 and will not be reflected, so that sufficient light is transmitted into the fingerprint identification module 40, and the fingerprint identification sensitivity is high.

Figure 7:
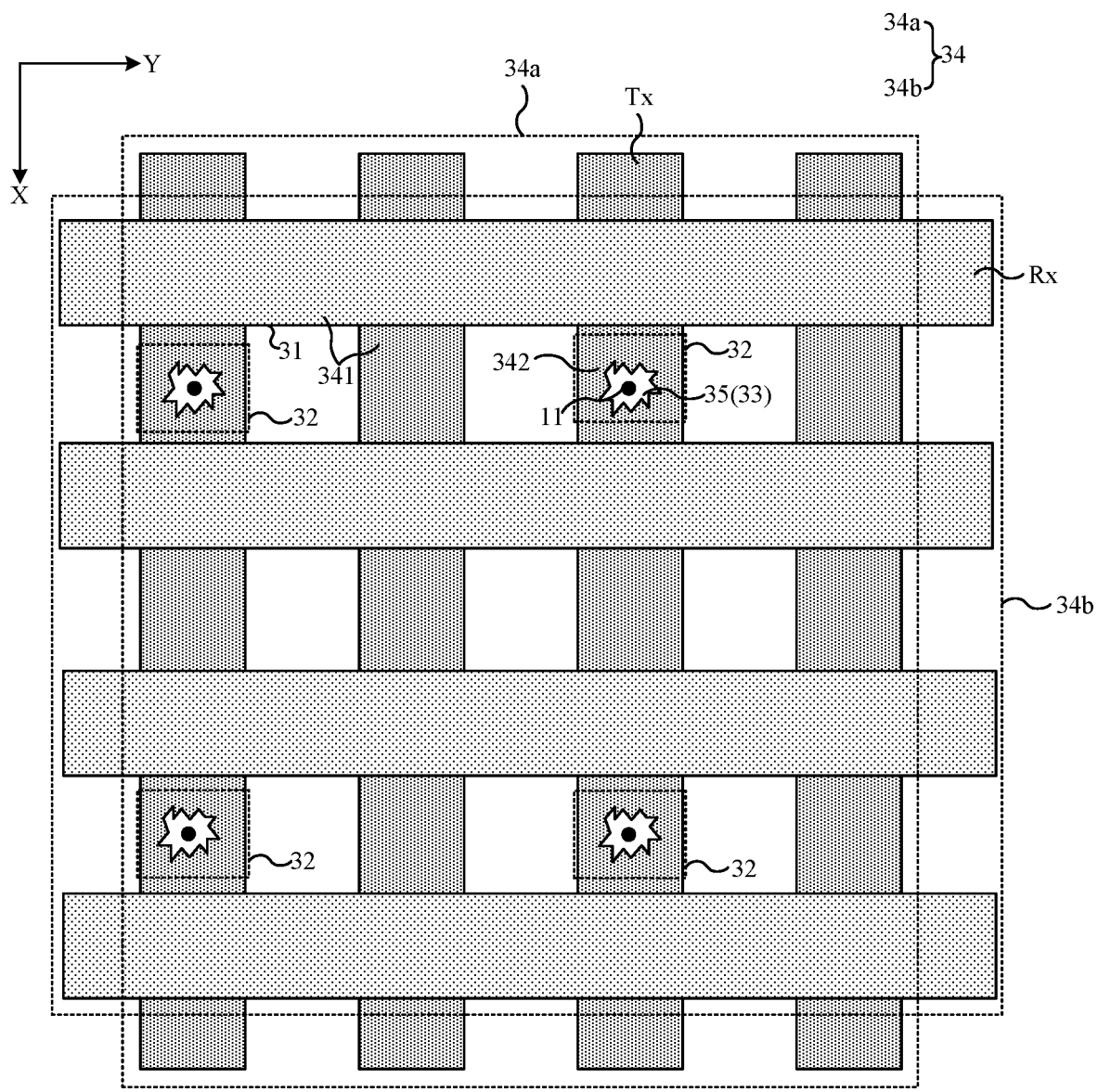
FIG. 7 is a top view of another display panel according to an embodiment of the present disclosure.

FIG. 7 is a top view of another display panel according to an embodiment of the present disclosure. As shown in FIG. 7, the hollowed-out area 35 has a serrated edge, so that the edge of the hollowed-out area 35 is formed by a plurality of irregular short lines connected to each other and has no regular long lines, which may reduce visibility of the hollowed-out area 35 and avoid the hollowed-out area 35 to affect a use effect of the display panel. It should be noted that FIG. 7 only illustrates that the hollowed-out area 35 has the serrated edge. It will be appreciated that the hollowed-out area 35 may have other edges, for example, a plurality of arcs with different radii of curvature are smoothly connected in sequence to form the edge of the hollowed-out area 35. In the embodiment of the present disclosure, a shape of the edge of the hollowed-out area 35 is not limited, and it is merely necessary to ensure that the edge of the hollowed-out area 35 has no regular long lines, which may reduce the visibility of the hollowed-out area 35 and avoid the hollowed-out area 35 to affect the use effect of the display panel.

Figure 8:
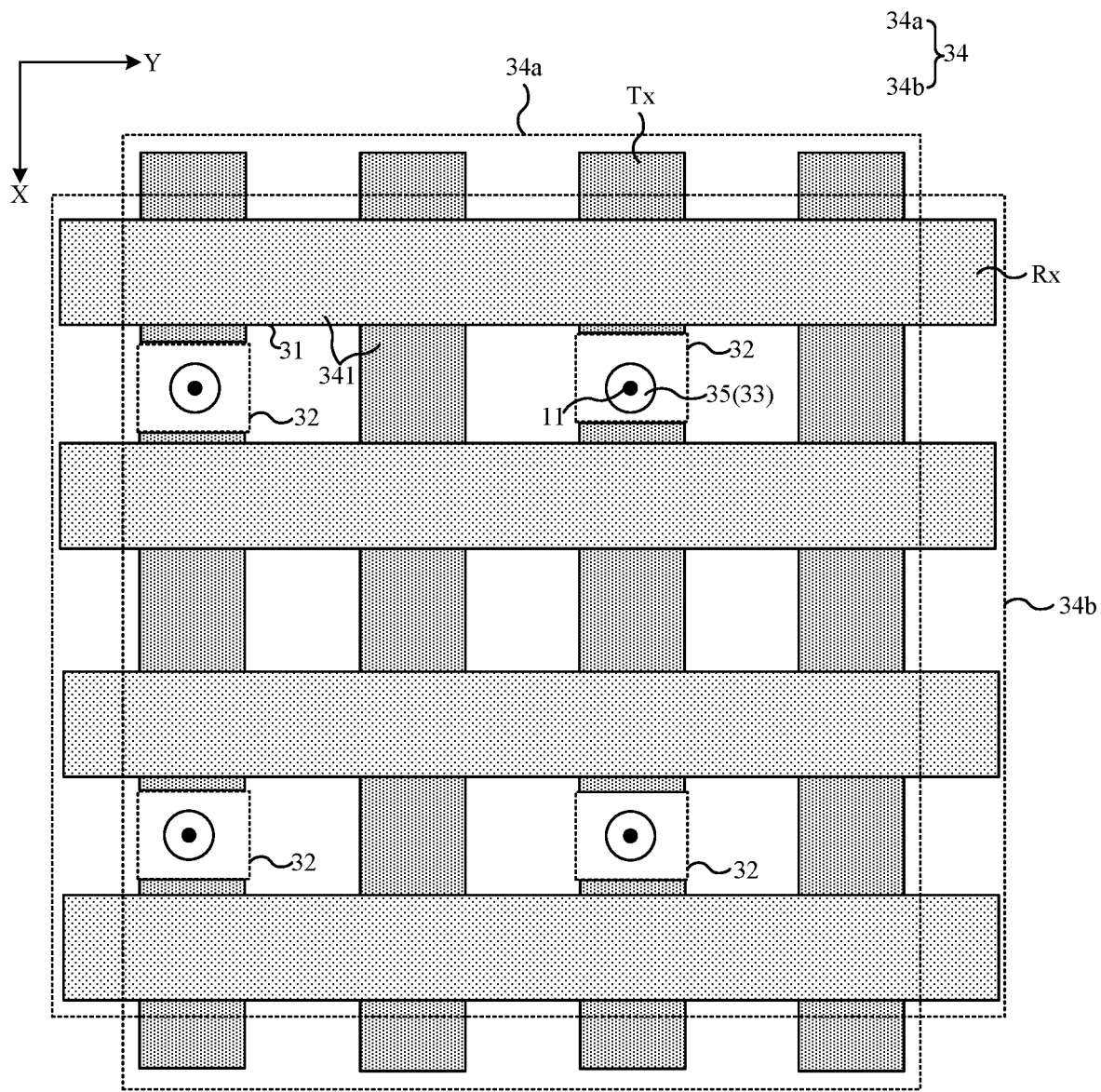
FIG. 8 is a top view of another display panel according to an embodiment of the present disclosure.

FIG. 8 is a top view of another display panel according to an embodiment of the present disclosure. FIG. 8 also illustrates that the touch function layer 30 is the mutual-capacitive touch function layer, and the touch drive electrode layer and the touch sensing electrode layer forming the mutual-capacitive touch function layer are located in different film layers. As shown in FIG. 8, the touch function layer 30 of the display panel provided by the present disclosure at least includes the touch electrode layer 34. The touch electrode layer 34 includes the first electrode pattern 341 in the first touch area 31, and the touch electrode layer 34 does not overlap with the second touch area 32. In this manner, no touch electrode layer 34 is disposed in the second touch area 32, light incident onto the second touch area 32 may be directly transmitted through the imaging aperture 11 into the fingerprint identification module 40, and will not be reflected by the touch electrode layer 34, so that sufficient light is transmitted into the fingerprint identification module 40, and the high fingerprint identification sensitivity is ensured. Exemplarily, the touch electrode layer 34 does not overlap with the second touch area 32, which may be understood as that the second touch electrode layer 34 does not extend in the second touch area 32, or that the touch electrode layer 34 includes a plurality of touch electrode blocks which are not disposed in the second touch area 32. In this way, it is ensured that the second touch area 34 does not reflect light, sufficient light is transmitted into the fingerprint identification module 40, and the fingerprint identification sensitivity is high.

Figure 9:
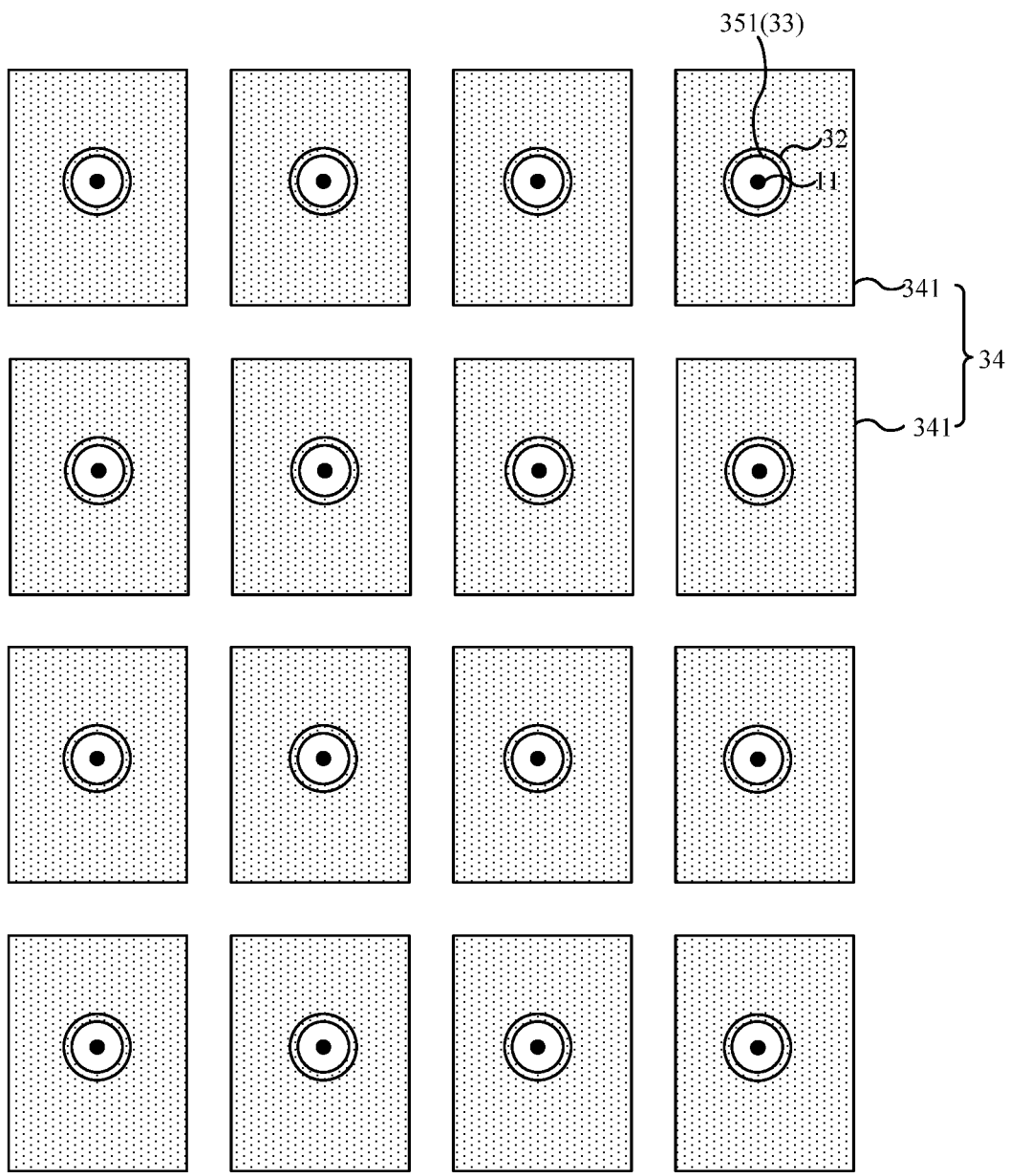
FIG. 9 is a top view of another display panel according to an embodiment of the present disclosure.
Figure 10:
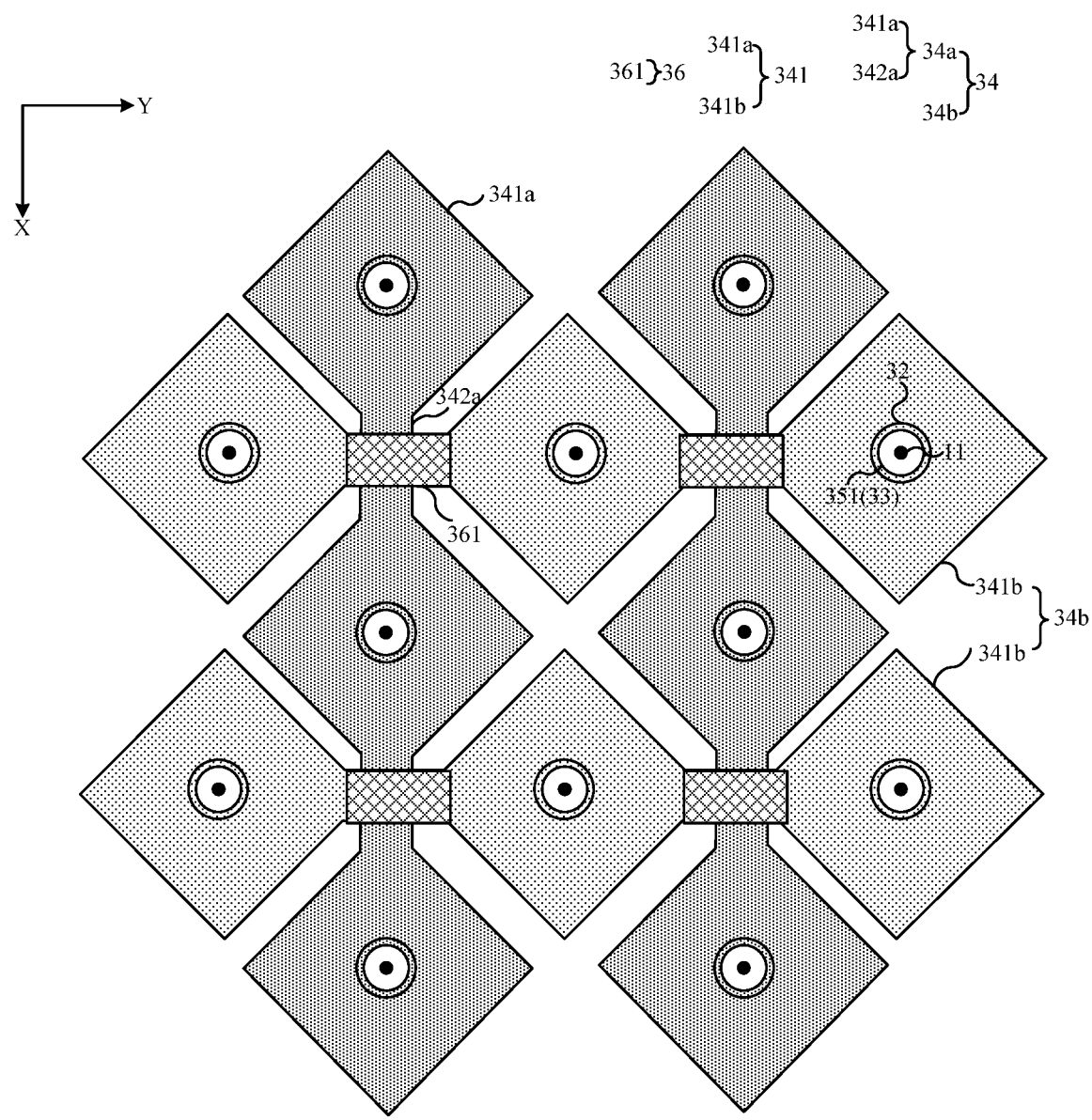
FIG. 10 is a top view of another display panel according to an embodiment of the present disclosure.

FIG. 9 is a top view of another display panel according to an embodiment of the present disclosure. FIG. 10 is a top view of another display panel according to an embodiment of the present disclosure. FIG. 9 illustrates that the touch function layer 30 is the self-capacitive touch function layer. FIG. 10 illustrates that the touch function layer 30 is the mutual-capacitive touch function layer, and the touch drive electrode layer 34*a* and the touch sensing electrode layer 34*b* forming the mutual-capacitive touch function layer include electrode blocks located in the same film layer. As shown in FIG. 9 and FIG. 10, the touch function layer 30 includes at least one touch electrode layer 34. The touch electrode layer 34 includes a plurality of electrode blocks 341. Each electrode block 341 located in the second touch area 32 includes a first hollowed-out area 351, and the first hollowed-out area 351 overlaps with the imaging aperture identification area 33.

Exemplarily, no matter whether the self-capacitive touch function layer or the mutual-capacitive touch function layer, it is set that the first hollowed-out area 351 in the electrode block 341 is configured to be overlapped with the imaging aperture identification area 33. FIG. 9 and FIG. 10 both illustrate that the first hollowed-out area 351 is completely overlapped with the imaging aperture identification area 33. In this way, it is ensured that light passing through the first hollowed-out area 351 is directly transmitted through the imaging aperture 11 into the fingerprint identification module 40 and will not be reflected, sufficient light is transmitted into the fingerprint identification module 40, and the fingerprint identification sensitivity is high.

Figure 11:
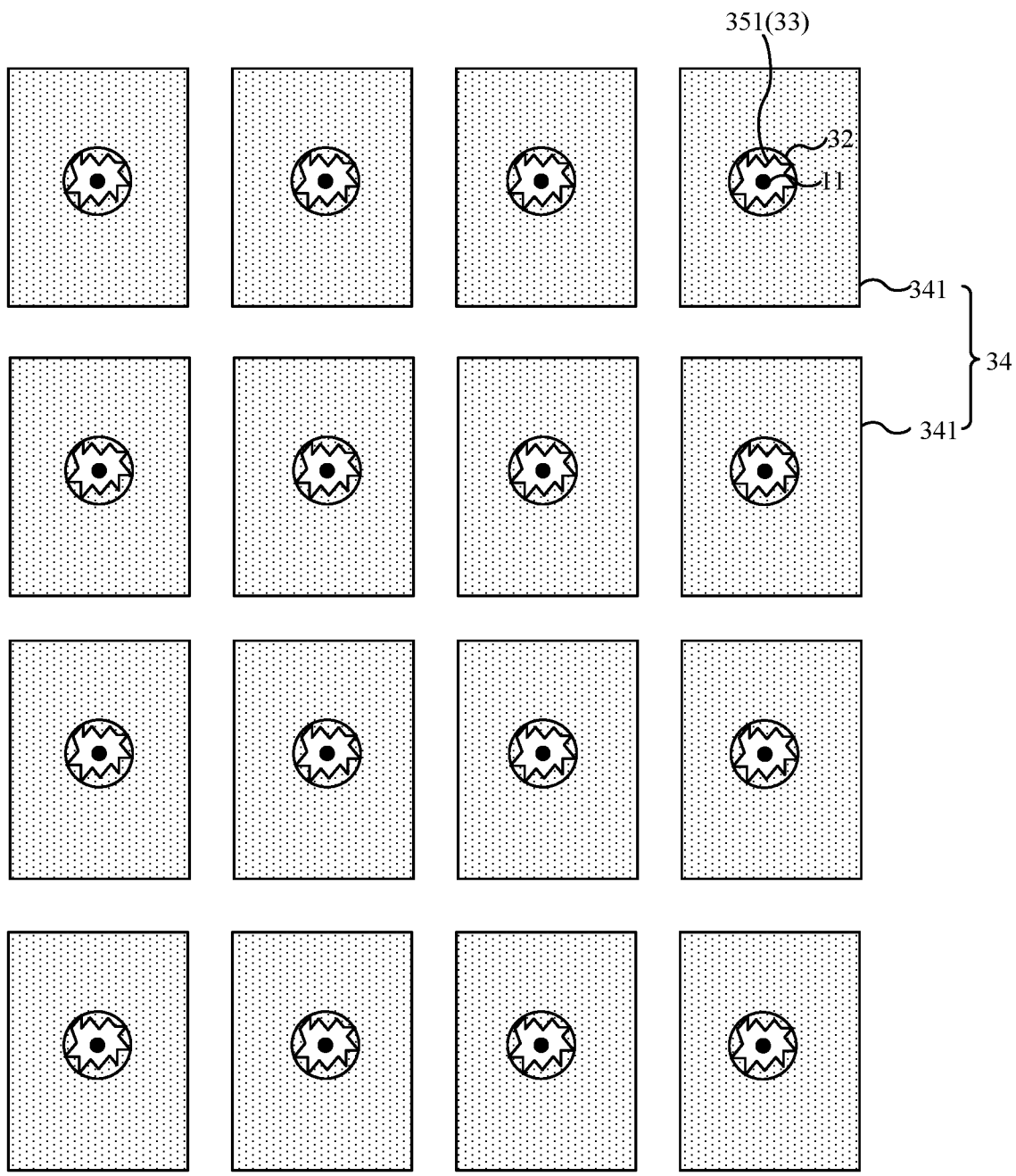
FIG. 11 is a top view of another display panel according to an embodiment of the present disclosure.
Figure 12:
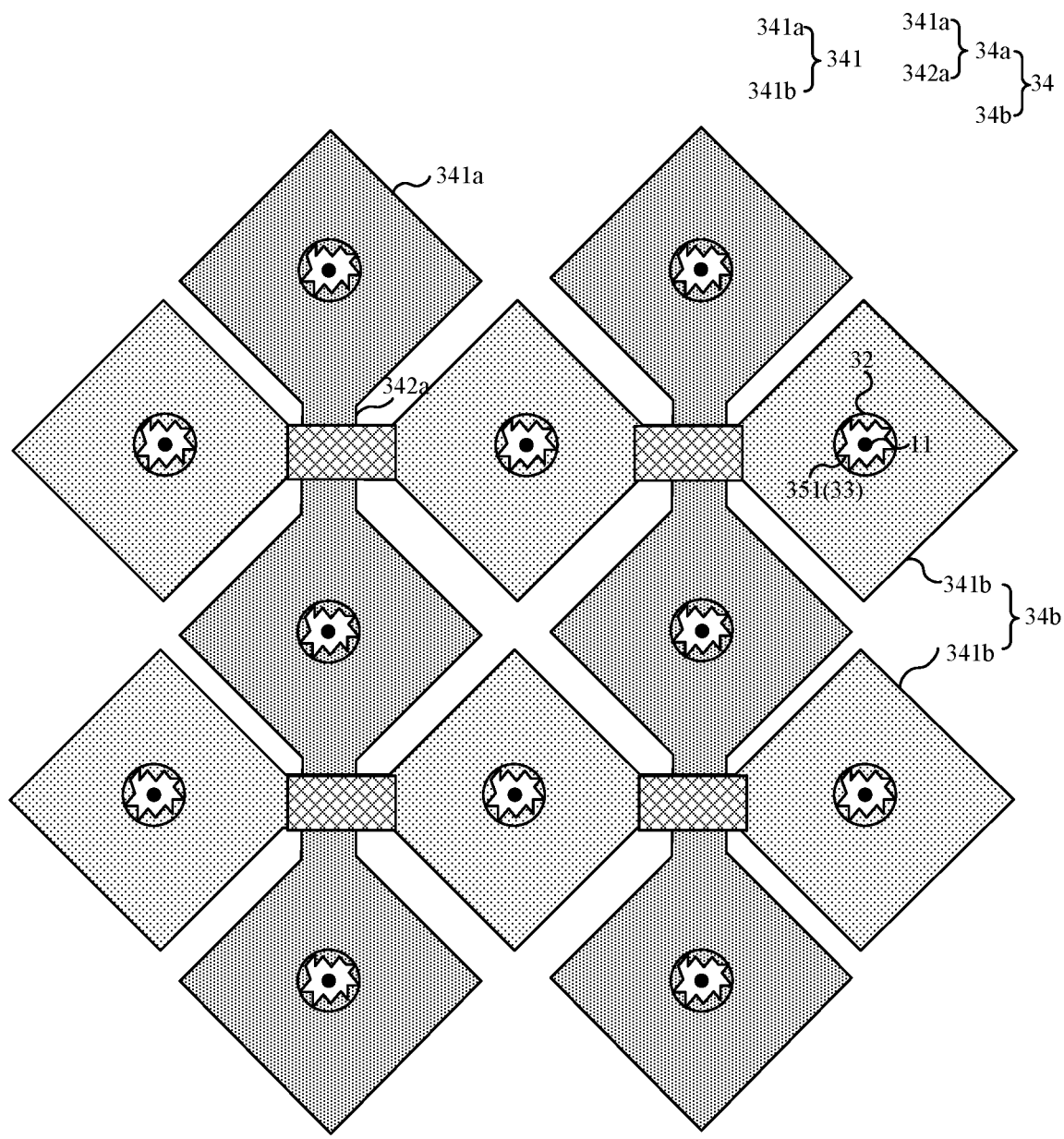
FIG. 12 is a top view of another display panel according to an embodiment of the present disclosure.

FIG. 11 is a top view of another display panel according to an embodiment of the present disclosure. FIG. 12 is a top view of another display panel according to an embodiment of the present disclosure. As shown in FIG. 11 and FIG. 12, the first hollowed-out area 351 has a serrated edge, so that the edge of the first hollowed-out area 351 is formed by a plurality of irregular short lines connected to each other and has no regular long lines, which may reduce the visibility of the hollowed-out area 35 and avoid the hollowed-out area 35 to affect the use effect of the display panel. It should be noted that FIG. 11 and FIG. 12 merely illustrate that the first hollowed-out area 351 has the serrated edge. It will be appreciated that the first hollowed-out area 351 may have other edges, for example, a plurality of arcs with different radii of curvature are smoothly connected in sequence to form the edge of the hollowed-out area 35. The shape of the edge of the hollowed-out area 35 is not limited in the embodiments of the present disclosure.

Still referring to FIG. 10, the touch electrode layer 34 includes the touch drive electrode layer 34*a* and the touch sensing electrode layer 34*b*, and the touch drive electrode layer 34*a* and the touch sensing electrode layer 34*b* include the electrode blocks 341 located in the same film layer. The touch function layer 30 further includes a bridge layer 36 separated from a film layer where the touch electrode layer 34 is located. The bridge layer 36 includes a plurality of bridges 361. Specifically, the touch drive electrode layer 34*a* includes a plurality of first electrode blocks 341*a*. Two adjacent first electrode blocks 341*a* arranged in the first direction (the direction X shown in the figure) are electrically connected by an interconnecting piece 342*a*. The interconnecting piece 342*a* and the first electrode block 341*a* are disposed in the same layer. The touch sensing electrode layer 34*b* includes a plurality of second electrode blocks 341*b*. Two adjacent second electrode blocks 341*b* arranged in the second direction (the direction Y shown in the figure) are electrically connected by the bridge 361. The bridge 361 and the second electrode block 341*b* are disposed in different layers. Exemplarily, the plurality of first electrode blocks 341*a* are arranged in the first direction. Two adjacent first electrode blocks 341*a* are connected by the interconnecting piece 342*a* in the same layer to form the touch drive electrode 34*a*. The plurality of second electrode blocks 341*b* are arranged in the second direction. Two adjacent second electrode blocks 341*b* are connected by the bridge 361 in the different layer to form the touch sensing electrode 34*b*. In a touch detection process, a touch drive signal is inputted into the touch drive electrode 34*a*. When a touch occurs, a touch sensing signal on the touch sensing electrode 34*b* is received, and a touch position and touch pressure are determined according to a difference between the touch sensing signal and the touch drive signal. An example in which the first electrode block 341*a* and the second electrode block 341*b* are both provided with the first hollowed-out area 351 is used for description in the embodiments of the present disclosure.

Figure 13:
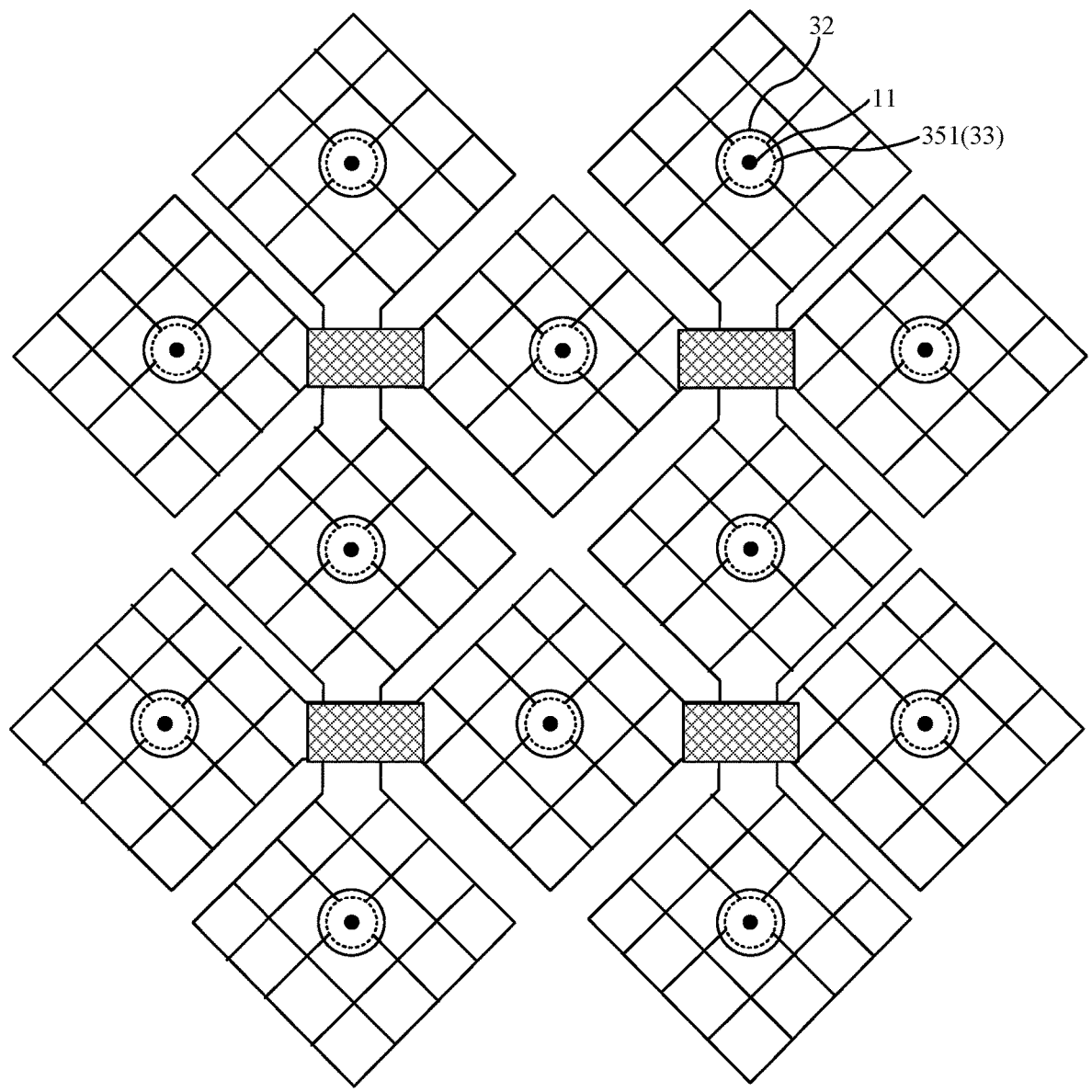
FIG. 13 is a top view of another display panel according to an embodiment of the present disclosure.
Figure 14:
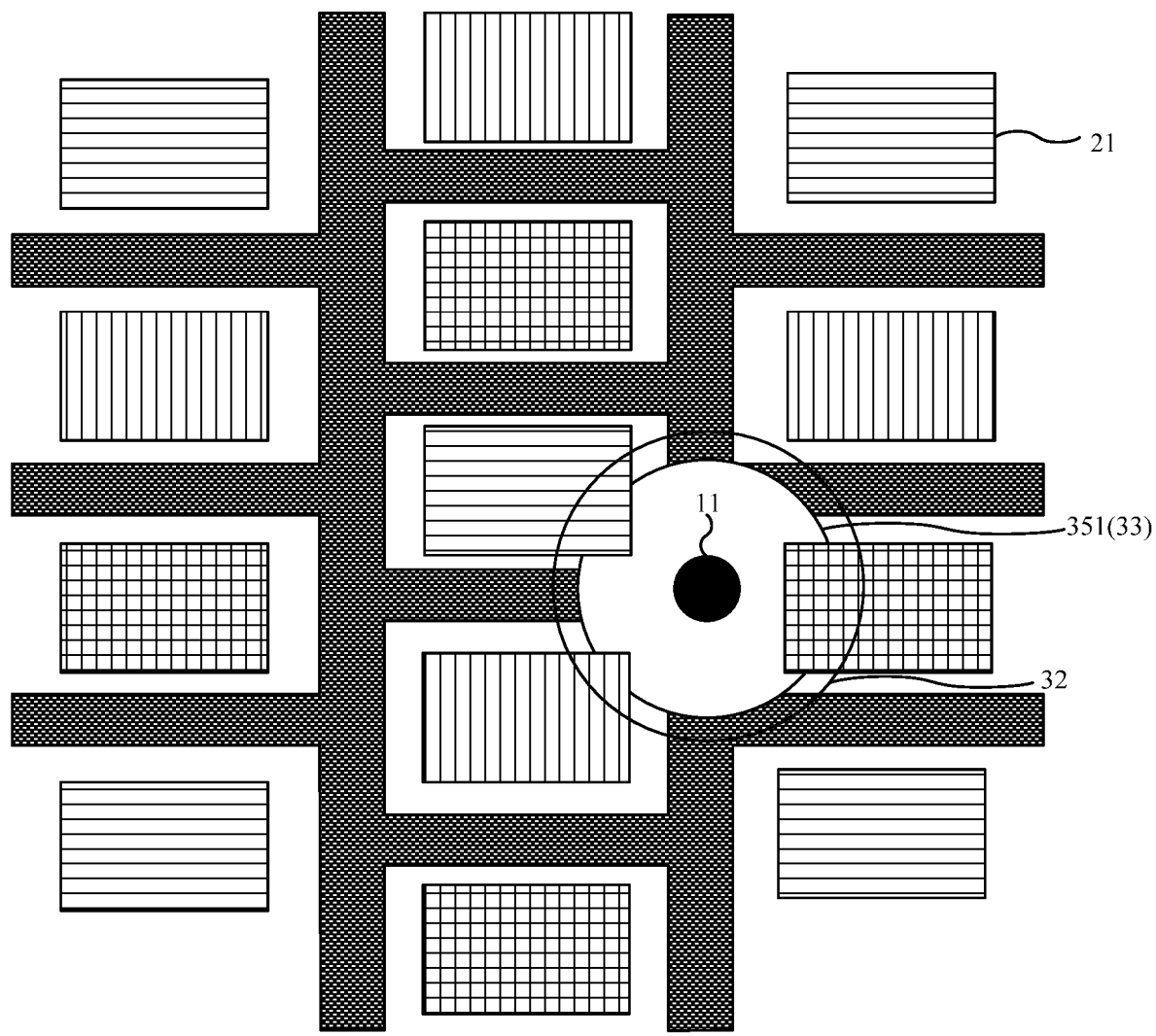
FIG. 14 is a top view of another display panel according to an embodiment of the present disclosure.

FIG. 13 is a top view of another display panel according to an embodiment of the present disclosure. FIG. 14 is a top view of another display panel according to an embodiment of the present disclosure. FIG. 13 and FIG. 14 both illustrate that the electrode block includes a metal mesh, and FIG. 14 merely exemplarily illustrates the metal mesh corresponding to one electrode block. A difference between FIG. 13 and FIG. 14 is that FIG. 13 illustrates a transparent metal mesh, FIG. 14 illustrates an opaque metal mesh. As shown in FIG. 13 and FIG. 14, to reduce the influence of coupling capacitance between the touch electrode layer 34 and other film layers below the touch electrode layer 34 on a display, the electrode block 341 in the embodiments of the present disclosure may include the metal mesh including a plurality of metal lines cross-connected to each other. The first hollowed-out area 351 is formed by disconnecting metal lines electrically connected to each other. The metal lines electrically connected to each other may be understood as that in the same electrode block, the disconnected metal line includes an end not in contact with other metal lines. If the disconnected metal line continues to extend, it will directly intersect another metal line in the same electrode block, resulting in connected meshes of a plurality of metal meshes in the electrode block. Optionally, the first hollowed-out area 351 is located within an area enclosed by a dashed line in the figure, that is, the first hollowed-out area 351 is a closed area enclosed by metal lines in the same electrode block. Specifically, when the metal mesh is the transparent metal mesh, the transparent metal mesh does not block the light emitted from the light-emitting units, so the transparent metal mesh may be formed by cross-connections of metal meshes located on first straight lines and transparent metal lines located on second straight lines. The first hollowed-out area 351 may be formed by disconnecting a metal line located on the same straight line. As shown in FIG. 13, the metal line located on the same straight line is disconnected to form the first hollowed-out area, thereby ensuring that a boundary of the transparent metal line is not located in the first hollowed-out area 351. The first hollowed-out area 351 may be ensured to uniformly receive light entering through the imaging aperture identification area 33, and the fingerprint identification sensitivity is ensured. Furthermore, when the metal mesh is the opaque metal mesh, the opaque metal mesh blocks the light emitted from the light-emitting units, so the opaque metal mesh needs to avoid a light-emitting area of the light-emitting unit. As shown in FIG. 14, the opaque metal mesh is disposed between two adjacent light-emitting units 21. At this time, the first hollowed-out area 351 is formed by disconnecting opaque metal meshes electrically connected to each other, ensuring that the opaque metal lines are not located in the first hollowed-out area 351. The first hollowed-out area 351 may be ensured to uniformly receive the light entering through the imaging aperture identification area 33, and the fingerprint identification sensitivity is ensured. At the same time, when the electrode block includes the metal mesh, the first hollowed-out area 351 is formed by disconnecting the metal lines electrically connected to each other, and thus the first hollowed-out area 351 has the serrated edge. As shown in FIG. 13 and FIG. 14, the visibility of the first hollowed-out area 35 may be reduced, and the influence of a visible first hollowed-out area 352 on the use effect of the display panel is reduced.

Figure 15:
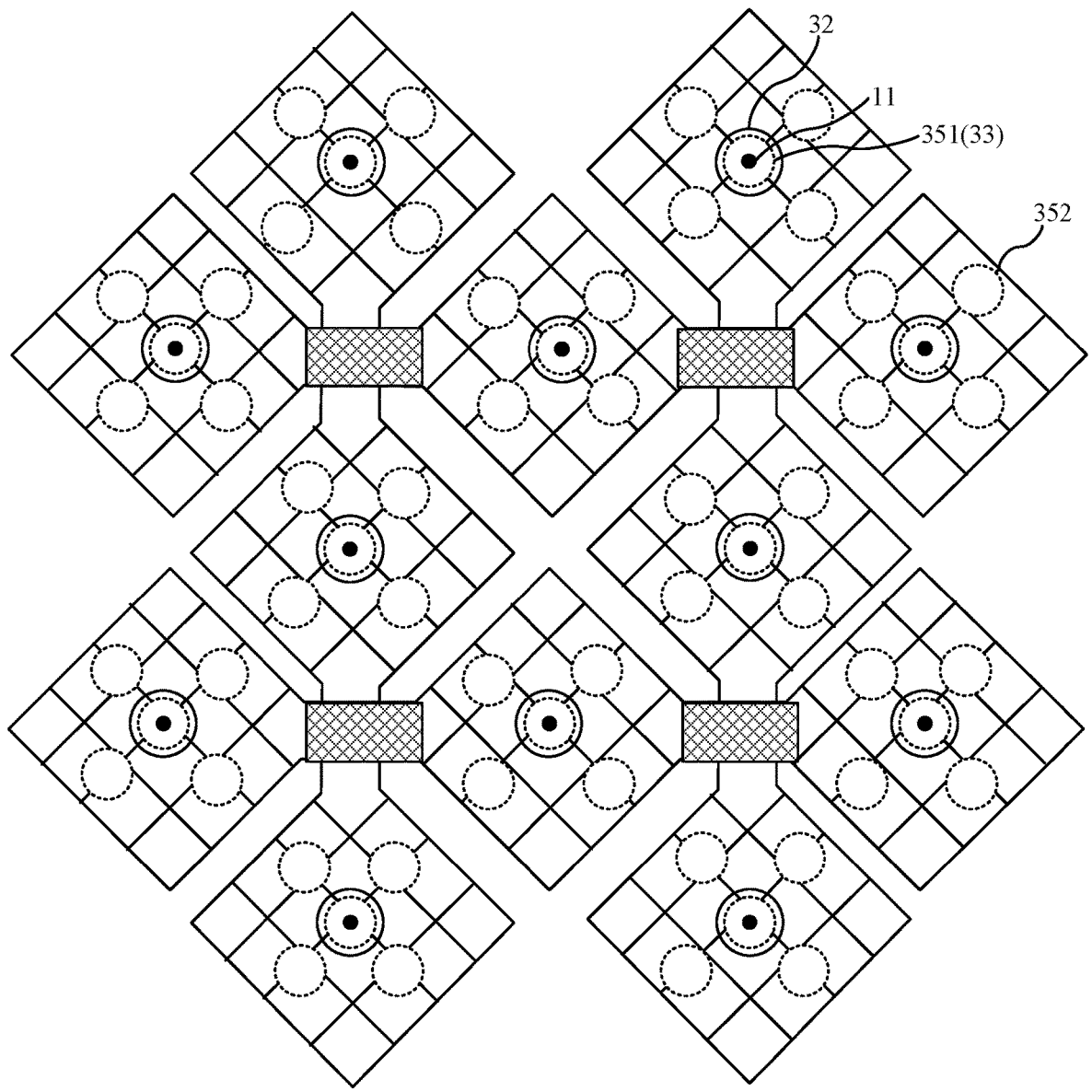
FIG. 15 is a top view of another display panel according to an embodiment of the present disclosure.

FIG. 15 is a top view of another display panel according to an embodiment of the present disclosure. As shown in FIG. 15, the display panel according to the embodiment of the present disclosure may further include a virtual hollowed-out area 352. The virtual hollowed-out area 352 is formed by disconnecting the metal lines electrically connected to each other. The virtual hollowed-out area 352 does not overlap with the imaging aperture identification areas 33.

Exemplarily, the virtual hollowed-out area 352 does not overlap with the imaging aperture identification area 33. Therefore, the virtual hollowed-out area 352 is provided not to increase the light flux into the fingerprint identification module 40, but to ensure that the hollowed-out areas are uniformly distributed on the touch electrode layer 34, thereby ensuring touch uniformity of the touch electrode layer 34, and improving the touch detection sensitivity of the touch functional layer 30.

It should be noted that the embodiment of the present disclosure is merely described using an example in which the virtual hollowed-out area 352 is formed by disconnecting the metal lines electrically connected to each other. It may be appreciated that when the touch electrode layer 34 does not include metal meshes, the touch electrode layer 34 in the embodiments of the present disclosure may also be provided with the virtual hollowed-out area 352. For example, the virtual hollowed-out area 352 is disposed in an electrode block provided as a whole block. On one hand, the touch uniformity of the entire touch electrode layer is ensured by providing the virtual hollowed-out area, and the problem that the hollowed-out area is visible is solved. On the other hand, by disposing the virtual hollowed-out area 352 in the whole electrode block, coupling capacitance between the electrode block and other film layers below the electrode block may be reduced, thereby reducing the influence of the coupling capacitance on a normal display of the display panel.

Still referring to FIG. 14, the virtual hollowed-out areas 352 and the first hollowed-out areas 351 in the touch electrode layer 34 are arranged in an array, and the first hollowed-out areas 351 are uniformly distributed. A number of virtual hollowed-out areas 352 is greater than or equal to twice a number of first hollowed-out areas 351.

Exemplarily, as shown in FIG. 15, the virtual hollowed-out areas 352 and the first hollowed-out areas 351 are arranged in the array. The first hollowed-out areas 351 are uniformly distributed, and the virtual hollowed-out areas 352 are uniformly distributed, which ensures a balanced touch accuracy of the touch electrode layer 34 and improves a touch sensitivity. On the other hand, it is set that the number of virtual hollowed-out areas 352 is greater than or equal to twice the number of first hollowed-out areas 351. For example, two virtual hollowed-out areas 352 may be disposed between two adjacent first hollowed-out areas 351 to ensure that an area of the touch electrode layer 34 facing the other film layers below the touch electrode layer 34 may be sufficiently reduced, the coupling capacitance between the electrode block and the other film layers below the electrode block may be reduced, and the influence of the coupling capacitance on the normal display of the display panel may be reduced.

Figure 16:
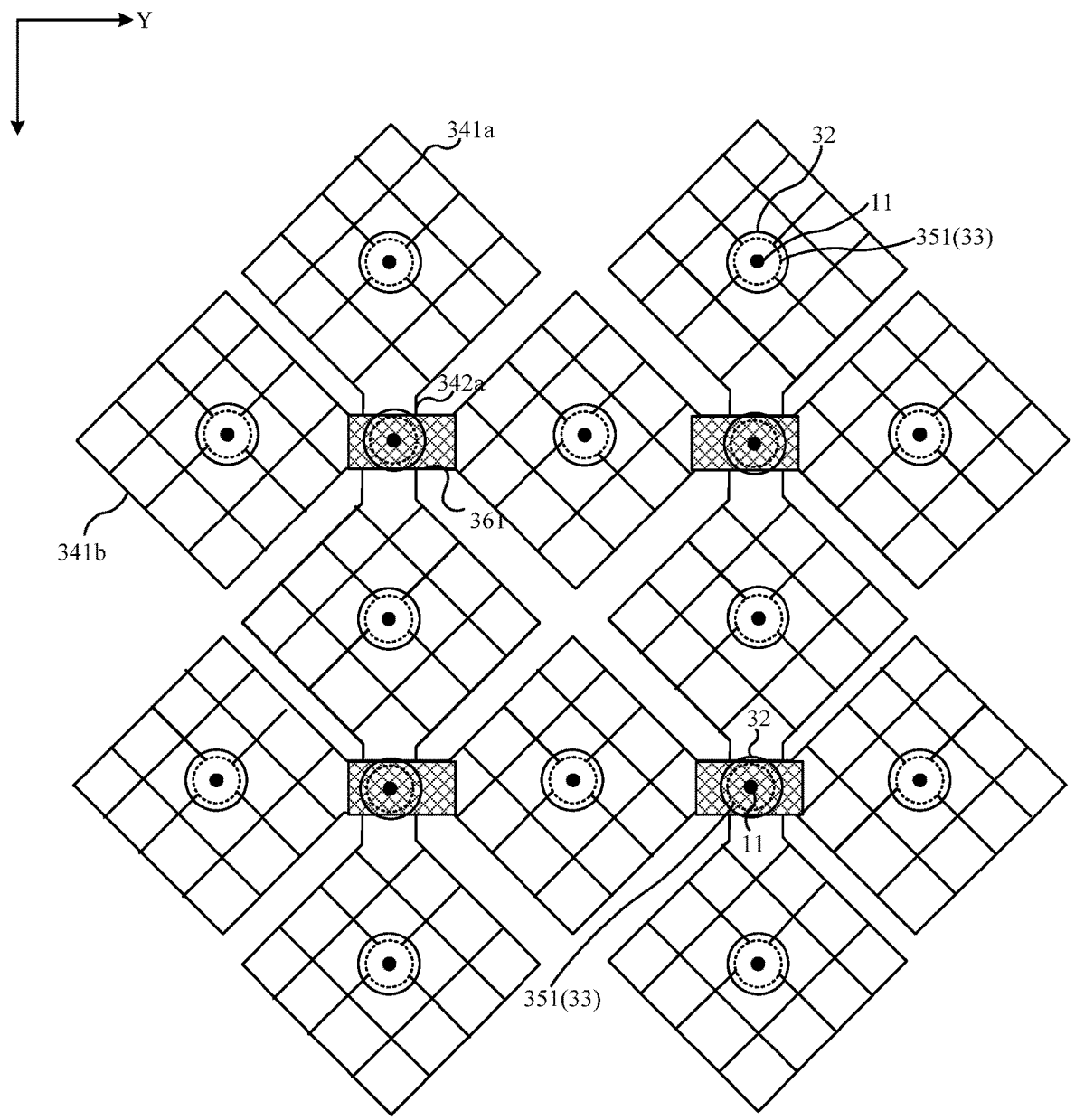
FIG. 16 is a top view of another display panel according to an embodiment of the present disclosure.

FIG. 16 is a top view of another display panel according to an embodiment of the present disclosure. As shown in FIG. 16, in the display panel according to the embodiment of the present disclosure, two adjacent second electrode blocks 341b in the same electrode are connected by the bridge 361. Optionally, the bridge 361 is a transparent conductive layer, and at least one bridge 361 overlaps with the second touch area 32.

Exemplarily, the plurality of first electrode blocks 341a are arranged in the first direction. Two adjacent first electrode blocks 341a are connected by the interconnecting piece 342a in the same layer to form the touch drive electrode 34a. The plurality of second electrode blocks 341b are arranged in the second direction. Two adjacent second electrode blocks 341b are connected by the bridge 361 in the different layer to form the touch sensing electrode 34b. A vertical projection of the bridge 361 on the substrate overlaps with a vertical projection of a second interconnecting piece 342a on the substrate, and the second interconnecting piece 342a may have the same structure as the first electrode block 341a and includes the transparent metal mesh. When the bridge 361 is the transparent conductive layer and at least one bridge 361 overlaps with the second touch area 32, it may be ensured that the imaging aperture identification area 33 overlapping with the second touch area 32 has a larger light transmittance, and a large light flux is ensured to be transmitted through the transparent bridge 361 into the fingerprint identification module 40.

Figure 17:
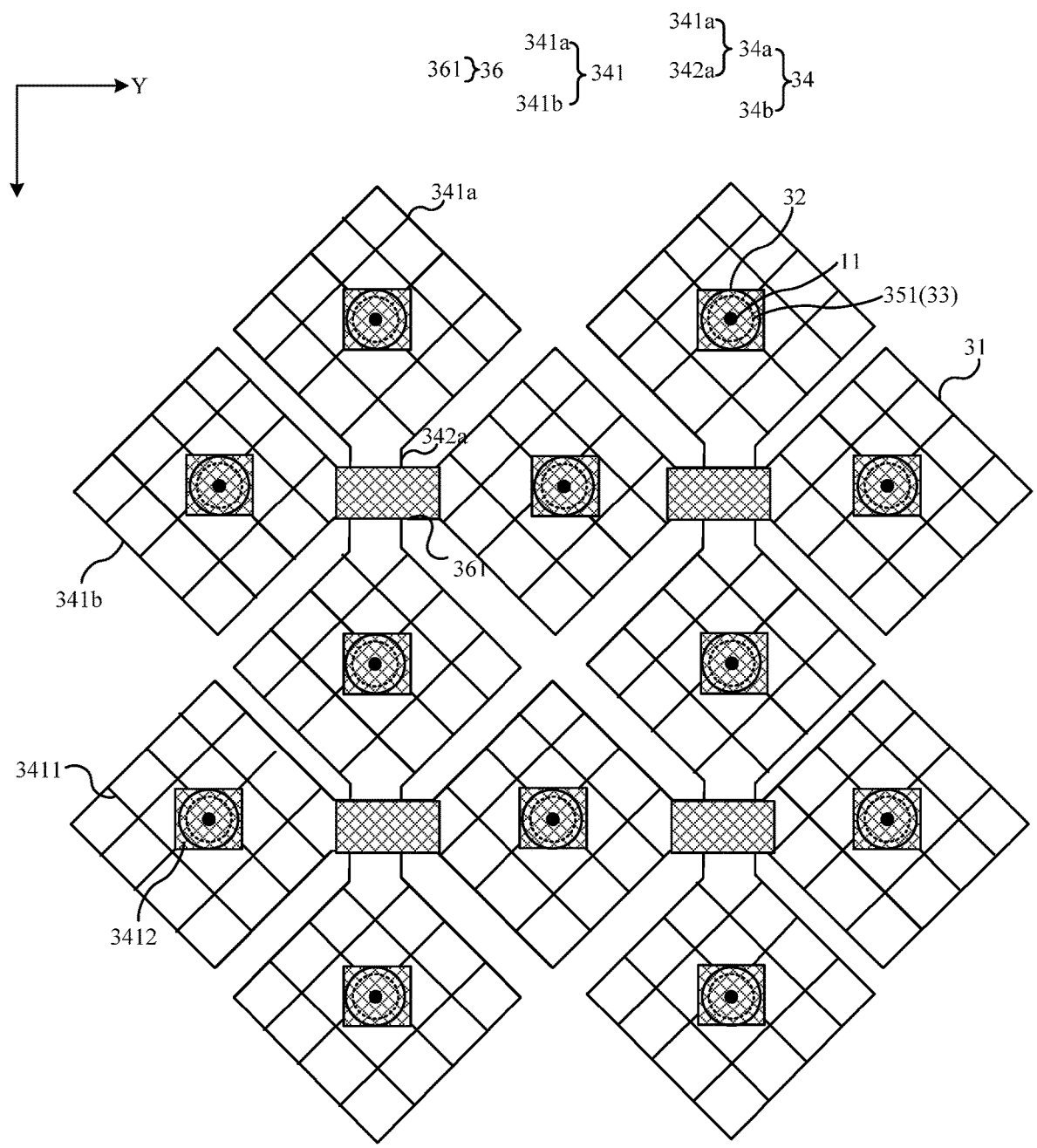
FIG. 17 is a top view of another display panel according to an embodiment of the present disclosure.

FIG. 17 is a top view of another display panel according to an embodiment of the present disclosure. As shown in FIG. 17, the touch drive electrode layer 34a and the touch sensing electrode layer 34b include electrode blocks located in the same layer. Specifically, the touch drive electrode layer 34a includes the plurality of first electrode blocks 341a. Two adjacent first electrode blocks 341a arranged in the first direction (the direction X shown in the figure) are electrically connected by the interconnecting piece 342a. The interconnecting piece 342a and the first electrode block 341a are disposed in the same layer. The touch sensing electrode layer 34b includes the plurality of second electrode blocks 341b. Two adjacent second electrode blocks 341b arranged in the second direction (the direction Y shown in the figure) are electrically connected by the bridge 361. The bridge 361 and the second electrode block 341b are disposed in different layers. Optionally, the first electrode block 341a and the second electrode block 341b may include metal meshes in the same layer. At the same time, the first electrode blocks 341a, the interconnecting pieces 342b, and the second electrode blocks 341b form a metal mesh layer. The bridge 361 and the metal mesh layer are separated by a touch insulating layer, and the touch insulating layer is made of transparent materials. A projection of one bridge 361 on the metal mesh layer overlaps with two second electrode blocks 341b, and contacts the two second electrode blocks 341b through a via on the touch insulating layer. Optionally, a material of the bridge 361, the transparent conductive layer, may be, for example, indium tin oxide (ITO).

Optionally, the electrode blocks 341 include the first electrode block 341a and the second electrode block 341b. At the same time, the electrode block 341 includes a first material area 3411 and a second material area 3412 electrically connected to each other. A vertical projection of the first material area 3411 on the substrate partially overlaps with a vertical projection of the second material area 3412 on the substrate. An insulating layer is disposed in an overlap area, and is in the same layer as the touch insulating layer between the bridge 361 and the second electrode block 341b. A via hole or an opening is formed in the insulating layer, so that the first material area 3411 and the second material area 3412 are electrically connected.

Furthermore, the first material area 3411 is located in the first touch area 31, and a second material area 3412 is located in the second touch area 32. The second material area 3412 overlaps with the imaging aperture identification areas 33, and reuses the bridge layer 36. Specifically, the bridge layer 36 further includes a conductive pattern disposed in the same layer as the bridge 361 and insulated from the bridge 361, that is, the conductive pattern is located in the second material area 3412. A projection of the conductive pattern overlaps with the imaging aperture identification area 33, and a size of the conductive pattern is greater than or equal to a size of the imaging aperture identification area 33.

Exemplarily, the second material area 3412 is disposed in the second touch area 32, the second material area 3412 overlaps with the imaging aperture identification area 33, and the second material area 3412 is electrically connected to the first material area 3411. In this way, the touch detection may also be performed when the touch position is located in the imaging aperture identification area 33, and a case where the touch detection cannot be performed when the touch position is located in the first hollowed-out area 351 disposed at a position corresponding to the imaging aperture identification area 33 may be avoided, thereby improving the touch detection sensitivity. Furthermore, the second material layer 3412 is configured to reuse the bridge layer 36, so that the display panel has a simple arrangement of film layers, and additional film layers are not required, which is beneficial to achieve the thinning design of the display panel.

Optionally, as shown in FIG. 6 to FIG. 17, an area of the touch electrode layer 34 on a unit area of the first touch area 31 is greater than an area of the touch electrode layer 34 on a unit area of the second touch area 32, so that the touch electrode layer 41 in the second touch area 32 has smaller reflectivity and greater transmittance than the touch electrode layer 34 in the first touch area 31, thereby ensuring a larger light flux transmitted through the second touch area 32 into the imaging aperture 11 and the fingerprint identification module 40, and the fingerprint identification accuracy and sensitivity are improved. Optionally, the area of the touch electrode layer 34 on the unit area of the first touch area 31 is set to be greater than the area of the touch electrode layer 34 on the unit area of the second touch area 32 by disposing the hollowed-out area in the second touch area 32, or reducing a number of metal lines or a width of the metal line in the metal mesh of the touch electrode in the second touch area 32. In this way, the area of the touch electrode layer 34 on the unit area of the first touch area 31 is greater than the area of the touch electrode layer 34 on the unit area of the second touch area 32, ensuring the fingerprint identification sensitivity and accuracy of the fingerprint identification module 40.

Figure 18:
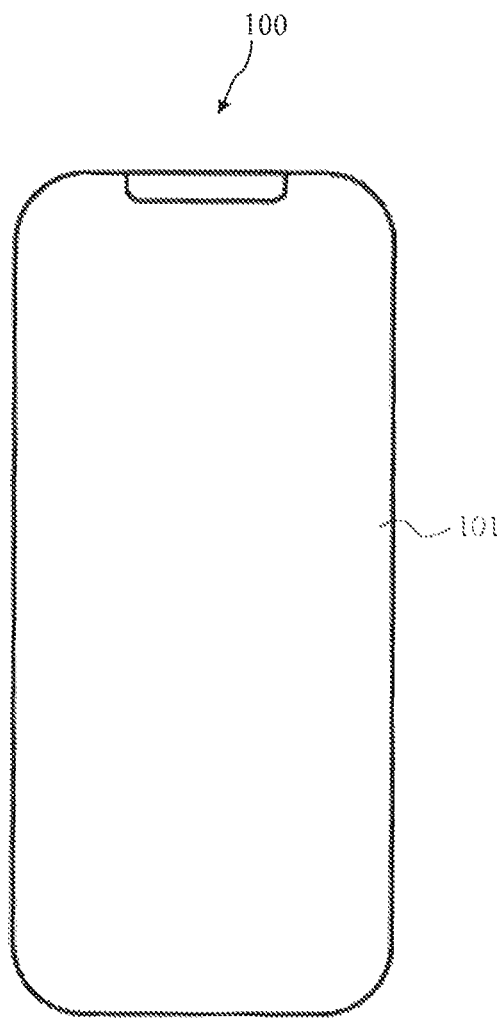
FIG. 18 is a schematic diagram of a display device according to an embodiment of the present disclosure.

Based on the same inventive concept, an embodiment of the present disclosure further provides a display device. FIG. 18 is a schematic diagram of a display device according to an embodiment of the present disclosure. The display device 100 according to the embodiment of the present disclosure includes the display panel 101 according to any embodiment of the present disclosure. Optionally, the display device according to the embodiment of the present disclosure may be a mobile phone shown in FIG. 18, or may be a computer, a television, a smart wearable display device or the like, which is not specifically limited in the embodiments of the present disclosure.

It is to be noted that the above are only preferred embodiments of the present disclosure and the technical principles used therein. It will be understood by those skilled in the art that the present disclosure is not limited to the specific embodiments described herein, and that the features of the various embodiments of the present disclosure may be coupled or combined in part or in whole with one another, and may be collaborated with one another and technically driven in various ways. Those skilled in the art can make various apparent modifications, adaptations, combinations and substitutions without departing from the scope of the present disclosure. Therefore, while the present disclosure has been described in detail through the above-mentioned embodiments, the present disclosure is not limited to the above-mentioned embodiments and may include more other equivalent embodiments without departing from the concept of the present disclosure. The scope of the present disclosure is defined by the scope of the appended claims.

What is claimed is:

1. A display panel, comprising:
a light-blocking layer and a light-emitting device layer disposed on the light-blocking layer, wherein the light-blocking layer comprises a plurality of imaging apertures;
a touch function layer disposed on one side of the light-emitting device layer facing away from the light-blocking layer, wherein the touch function layer comprises a plurality of first touch areas and a plurality of second touch areas, wherein the plurality of first touch areas do not overlap with imaging aperture identification areas, and one of the plurality of second touch areas overlaps with a respective one of the imaging aperture identification areas, or one of the imaging aperture identification areas is covered by a respective one of the plurality of second touch areas; wherein a reflectivity of each of the plurality of second touch areas is smaller than a reflectivity of each of the plurality of first touch areas, or wherein a transmittance of each of the plurality of second touch areas is greater than a transmittance of each of the plurality first touch areas, or wherein light transmission uniformity of each of the plurality of second touch areas is greater than light transmission uniformity of each of the plurality of first touch areas, or wherein each of the plurality of second touch areas comprises a hollowed-out area; and each of the imaging aperture identification areas is an identifiable area of one of the plurality of imaging apertures on a plane where the touch function layer is located; and
a fingerprint identification module disposed on one side of the light-blocking layer facing away from the light-emitting device layer, wherein the fingerprint identification module is configured to receive first reflected light reflected through the light-blocking layer by a touch body and perform fingerprint identification according to the first reflected light;
wherein $$d \geq \frac{\sqrt{2}\,P}{2u} \times h,$$

wherein d denotes a distance between an edge of an orthographic projection of the second touch area on a plane where the light-blocking layer is located and the each of the plurality of imaging apertures, P denotes a distance between center points of any two adjacent imaging apertures among the plurality of imaging apertures, u denotes a vertical distance between a touch surface of the display panel and the light-blocking layer, and h denotes vertical distance between the touch function layer and the light-blocking layer;
wherein P=700 μm, u=1000 μm, and h=300 μm.

2. The display panel of claim 1, wherein the touch function layer at least comprises a touch electrode layer, wherein the touch electrode layer comprises a first electrode pattern in the first touch area and a second electrode pattern in the second touch area, wherein the second electrode pattern overlaps with the imaging aperture identification areas, and a transmittance of the second electrode pattern is greater than a transmittance of the first electrode pattern.

3. The display panel of claim 2, wherein the second electrode pattern comprises the hallowed-out area, wherein the hollowed-out area overlaps with the at least one of the imaging aperture identification areas.

4. The display panel of claim 3, wherein the hollowed-out area has a serrated edge.

5. The display panel of claim 1, wherein the touch function layer at least comprises a touch electrode layer, wherein the touch electrode layer comprises a first electrode pattern in the first touch area, and the touch electrode layer does not overlap with the second touch area.

6. The display panel of claim 1, wherein the touch function layer comprises at least one touch electrode layer, wherein each of the at least one touch electrode layer comprises a plurality of electrode blocks, wherein each of the plurality of electrode blocks in the second touch area comprises a first hollowed-out area, and the first hollowed-out area overlaps with one of the imaging aperture identification areas.

7. The display panel of claim 6, wherein the first hollowed out area has a serrated edge.

8. The display panel of claim 6, wherein the each of the plurality of electrode blocks comprises a metal mesh, wherein the metal mesh comprises a plurality of metal lines cross-connected to each other, and wherein the first hollowed-out area is formed by disconnecting metal lines electrically connected to each other.

9. The display panel of claim 8, wherein the each of the plurality of electrode blocks further comprises a virtual hollowed-out area, wherein the virtual hollowed-out area is formed by disconnecting metal lines located on a same straight line, and wherein the virtual hollowed-out area does not overlap with the imaging aperture identification areas.

10. The display panel of claim 9, wherein virtual hollowed-out areas and first hollowed-out areas in the touch electrode layer are arranged in an array, the first hollowed-out areas in the touch electrode layer are uniformly arranged, and a number of the virtual hollowed-out areas is greater than or equal to twice a number of the first hollowed-out areas.

11. The display panel of claim 6, wherein the touch function layer at least comprises the touch electrode layer and a bridge layer separated by an insulating layer from a film layer where the touch electrode layer is located, wherein the touch electrode layer comprises the plurality of electrode blocks, the bridge layer comprises a plurality of bridges, two adjacent electrode blocks among the plurality of electrode blocks are electrically connected by at least one of the plurality of bridges, and wherein the bridge layer is a transparent conductive layer; and at least one of the plurality of bridges overlaps with the second touch area.

12. The display panel of claim 11, wherein the each of the plurality of electrode blocks comprises a first material area and a second material area which are electrically connected, wherein the first material area is located in the first touch area, the second material area is located in the second touch area, the second material area overlaps with the imaging aperture identification areas, and the second material area reuses the bridge layer.

13. The display panel of claim 1, wherein the touch function layer at least comprises a touch electrode layer; wherein an area of the touch electrode layer on a unit area of the first touch area is larger than an area of the touch electrode layer on a unit area of the second touch area.

14. A display device, comprising a display panel, wherein the display panel comprises:

a light-blocking layer and a light-emitting device layer disposed on the light-blocking layer, wherein the light-blocking layer comprises a plurality of imaging apertures;

a touch function layer disposed on one side of the light-emitting device layer facing away from the light-blocking layer, wherein the touch function layer comprises a plurality of first touch areas and a plurality of second touch areas, wherein the plurality of first touch areas do not overlap with imaging aperture identification areas, and one of the plurality of second touch areas overlaps with a respective one of the imaging aperture identification areas, or one of the imaging aperture identification areas is covered by a respective one of the plurality of second touch areas; wherein a reflectivity of each of the plurality of second touch areas is smaller than a reflectivity of each of the plurality of first touch areas, or wherein a transmittance of each of the plurality of second touch areas is greater than a transmittance of each of the plurality of first touch areas, or wherein light transmission uniformity of each of the plurality of second touch areas is greater than light transmission uniformity of each of the plurality of first touch areas, or wherein each of the plurality of second touch areas comprises a hollowed-out area; and each of the imaging aperture identification areas is an identifiable area of one of the plurality of imaging apertures on a plane where the touch function layer is located; and a fingerprint identification module disposed on one side of the light-blocking layer facing away from the light-emitting device layer, wherein the fingerprint identification module is configured to receive first reflected light reflected through the light-blocking layer by a touch body and perform fingerprint identification according to the first reflected light;

wherein $$d \geq \frac{\sqrt{2}P}{2u} \times h,$$

wherein d denotes a distance between an edge of an orthographic projection of the second touch area on a plane where the light-blocking layer is located and the each of the plurality of imaging apertures, P denotes a distance between center points of any two adjacent imaging apertures among the plurality of imaging apertures, u denotes a vertical distance between a touch surface pf the display panel and the light-blocking layer, and h denotes a vertical distance between the touch function layer and the light-blocking layer;

wherein P=700 μm, u=1000 μm, and h=300 μm.

15. A display panel, comprising:

a light-blocking layer and a light-emitting device layer disposed on the light-blocking layer, wherein the light-blocking layer comprises a plurality of imaging apertures;

a touch function layer disposed on one side of the light-emitting device layer facing away from the light-blocking layer, wherein the touch function layer comprises a plurality of first touch areas and a plurality of second touch areas, wherein the plurality of first touch areas do not overlap with imaging aperture identification areas, and the plurality of second touch areas overlap with at least one of the imaging aperture identification areas;

wherein a reflectivity of each of the plurality of second touch areas is smaller than a reflectivity of each of the plurality of first touch areas, or wherein a transmittance of each of the plurality of second touch areas is greater than a transmittance of each of the plurality of first touch areas, or wherein light transmission uniformity of each of the plurality of second touch areas is greater than light transmission uniformity of each of the plurality of first touch areas, or wherein each of the plurality of second touch areas comprises a hollowed-out area; and each of the imaging aperture identification areas is an identifiable area of one of the plurality of imaging apertures on a plane where the touch function layer is located; and a fingerprint identification module disposed on one side of the light-blocking layer facing away from the light-emitting device layer, wherein the fingerprint identification module is configured to receive first reflected light reflected through the light-blocking layer by a touch body and perform fingerprint identification according to the first reflected light;

wherein $$d \geq \frac{\sqrt{2}P}{2u} \times h,$$

wherein d denotes a distance between an edge of an orthographic projection of the second touch area on a plane where the light-blocking, layer is located and the each of the plurality of imaging apertures, P denotes a distance between center points of any two adjacent imaging apertures among the plurality of imaging apertures, u denotes a vertical distance between a touch surface of the display panel and the light-blocking layer, and h denotes a vertical distance between the touch function layer and the light-blocking layer;
wherein P=700 μm, u=1000 μm, and h=300 μm.

* * * * *